(12) United States Patent
Lee et al.

(10) Patent No.: US 12,107,793 B2
(45) Date of Patent: *Oct. 1, 2024

(54) PHYSICAL DOWNLINK CONTROL CHANNEL (PDCCH) MONITORING WITH OVERLAPPING RESOURCES

(71) Applicant: QUALCOMM Incorporated, San Diego, CA (US)

(72) Inventors: Heechoon Lee, San Diego, CA (US); Wanshi Chen, San Diego, CA (US); Peter Gaal, San Diego, CA (US); Jing Sun, San Diego, CA (US); Joseph Binamira Soriaga, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/653,124

(22) Filed: Mar. 1, 2022

(65) Prior Publication Data

US 2022/0190992 A1 Jun. 16, 2022

Related U.S. Application Data

(63) Continuation of application No. 16/216,850, filed on Dec. 11, 2018, now Pat. No. 11,271,701.

(Continued)

(51) Int. Cl.
*H04L 5/00* (2006.01)
*H04L 1/00* (2006.01)
(Continued)

(52) U.S. Cl.
CPC .......... *H04L 5/0053* (2013.01); *H04L 1/0038* (2013.01); *H04L 1/0068* (2013.01);
(Continued)

(58) Field of Classification Search
CPC ..... H04L 5/0053; H04L 1/0038; H04L 5/007; H04L 1/0068; H04W 72/08; H04W 72/042
See application file for complete search history.

(56) References Cited

U.S. PATENT DOCUMENTS 9,705,653 B2* 7/2017 Chen ...................... H04L 5/0007
10,390,274 B2* 8/2019 Kim ........................ H04W 4/46
(Continued)

FOREIGN PATENT DOCUMENTS

| CN | 102469048 A | 5/2012 |
| CN | 102843748 A | 12/2012 |
| EP | 2547017 A2 | 1/2013 |

OTHER PUBLICATIONS

"3rd Generation Partnership Project; Technical Specification Group Radio Access Network; NR; Physical layer procedures for control (Release 15)," 3GPP Standard; Technical Specification; 3GPP TS 38.213, 3rd Generation Partnership Project (3GPP), Mobile Competence Centre; 650, Route Des Lucioles; F-06921 Sophia-Antipolis Cedex; France, vol. RAN WG1, No. V15.0.0, Jan. 3, 2018 (Jan. 3, 2018), pp. 1-56, XP051392263, [retrieved on Jan. 3, 2018].

(Continued)

*Primary Examiner* — Parth Patel
(74) *Attorney, Agent, or Firm* — Guang Yu Zhang; Haynes and Boone, LLP

(57) ABSTRACT

Wireless communications systems and methods related to downlink (DL) control channel communications are provided. A wireless communication device identifies a search space set including a plurality of PDCCH candidate search spaces for a downlink control channel. The wireless communication device determines that a first resource associated with a first PDCCH candidate search space of the plurality of PDCCH candidate search spaces overlaps with a preconfigured resource. The wireless communication device moni- (Continued)

tors for a downlink control message over the downlink control channel by excluding monitoring in at least the first PDCCH candidate search space based on the determining.

10 Claims, 15 Drawing Sheets

Related U.S. Application Data

(60) Provisional application No. 62/617,071, filed on Jan. 12, 2018.

(51) Int. Cl.
*H04W 72/23* (2023.01)
*H04W 72/54* (2023.01)

(52) U.S. Cl.
CPC ........... *H04W 72/23* (2023.01); *H04W 72/54* (2023.01); *H04L 5/0007* (2013.01)

(56) References Cited

U.S. PATENT DOCUMENTS

| | | | | |
|---|---|---|---|---|
| 10,448,389 | B1* | 10/2019 | Seo | H04L 5/0053 |
| 2010/0034077 | A1* | 2/2010 | Ishii | H04L 27/26 370/210 |
| 2010/0195582 | A1* | 8/2010 | Koskinen | H04L 5/0032 370/329 |
| 2011/0274060 | A1* | 11/2011 | Luo | H04L 5/0062 370/329 |
| 2013/0230013 | A1* | 9/2013 | Seo | H04L 5/0035 370/329 |
| 2014/0128085 | A1 | 5/2014 | Charbit | |
| 2015/0146639 | A1* | 5/2015 | Seo | H04L 5/0053 370/329 |
| 2015/0264667 | A1* | 9/2015 | Lee | H04L 5/001 370/329 |
| 2016/0043849 | A1* | 2/2016 | Lee | H04L 5/0053 370/329 |
| 2016/0050617 | A1* | 2/2016 | Hwang | H04W 48/16 455/434 |
| 2016/0080963 | A1* | 3/2016 | Marinier | H04W 24/10 370/252 |
| 2016/0204930 | A1* | 7/2016 | Song | H04L 5/1476 370/280 |
| 2016/0254892 | A1* | 9/2016 | Kim | H04W 52/34 370/280 |
| 2017/0013390 | A1* | 1/2017 | You | H04W 72/52 |
| 2018/0063865 | A1* | 3/2018 | Islam | H04L 5/0064 |
| 2018/0102880 | A1* | 4/2018 | Xu | H04W 72/04 |
| 2018/0199343 | A1* | 7/2018 | Deogun | H04W 72/0453 |
| 2018/0227156 | A1* | 8/2018 | Papasakellariou | H04W 72/0453 |
| 2018/0279289 | A1* | 9/2018 | Islam | H04W 72/0446 |
| 2018/0279380 | A1* | 9/2018 | Jung | H04W 74/0833 |
| 2018/0287734 | A1* | 10/2018 | Lee | H04L 5/0048 |
| 2018/0324789 | A1* | 11/2018 | Park | H04L 5/0044 |
| 2018/0359733 | A1* | 12/2018 | Bagheri | H04W 72/30 |
| 2018/0367202 | A1* | 12/2018 | Yang | H04B 7/0639 |
| 2018/0368169 | A1* | 12/2018 | Jung | H04W 72/0453 |
| 2019/0007959 | A1* | 1/2019 | Hwang | H04W 72/0446 |
| 2019/0021119 | A1* | 1/2019 | Ng | H04W 74/006 |
| 2019/0053227 | A1* | 2/2019 | Huang | H04L 5/0098 |
| 2019/0053272 | A1* | 2/2019 | Tsai | H04W 74/0833 |
| 2019/0058517 | A1* | 2/2019 | Kang | H04B 7/0626 |
| 2019/0082427 | A1* | 3/2019 | Kim | H04W 72/0446 |
| 2019/0103951 | A1* | 4/2019 | Park | H04W 72/0446 |
| 2019/0116608 | A1* | 4/2019 | Kim | H04W 72/04 |
| 2019/0140776 | A1* | 5/2019 | Seo | H04B 7/0456 |
| 2019/0150187 | A1* | 5/2019 | Park | H04L 5/0094 370/330 |
| 2019/0158205 | A1* | 5/2019 | Sheng | H04L 5/0048 |
| 2019/0158259 | A1* | 5/2019 | Park | H04W 72/0446 |
| 2019/0166593 | A1* | 5/2019 | Liao | H04L 5/0094 |
| 2019/0190582 | A1* | 6/2019 | Guo | H04L 1/0061 |
| 2019/0215098 | A1* | 7/2019 | Tiirola | H04L 5/0053 |
| 2019/0215781 | A1* | 7/2019 | Jeon | H04W 52/325 |
| 2019/0222391 | A1* | 7/2019 | Lee | H04L 5/0053 |
| 2019/0261372 | A1* | 8/2019 | Zhou | H04L 5/0044 |
| 2019/0268208 | A1* | 8/2019 | Seo | H04L 27/2657 |
| 2019/0268792 | A1* | 8/2019 | Marinier | H04W 24/08 |
| 2019/0306737 | A1* | 10/2019 | Kwak | H04L 5/0053 |
| 2019/0327757 | A1* | 10/2019 | Oteri | H04L 5/0053 |
| 2019/0327767 | A1* | 10/2019 | Islam | H04L 27/2666 |
| 2019/0357183 | A1* | 11/2019 | Takeda | H04W 72/04 |
| 2019/0379491 | A1* | 12/2019 | Kilinc | H04L 1/1864 |
| 2019/0379516 | A1* | 12/2019 | Horiuchi | H04L 5/0094 |
| 2020/0021998 | A1* | 1/2020 | Baldemair | H04W 16/14 |
| 2020/0029312 | A1* | 1/2020 | Falahati | H04W 72/0453 |
| 2020/0120655 | A1* | 4/2020 | Ma | H04L 5/0053 |
| 2020/0177306 | A1* | 6/2020 | Choi | H04L 5/0053 |
| 2020/0187230 | A1* | 6/2020 | Xia | H04W 72/04 |
| 2020/0205138 | A1* | 6/2020 | Nam | H04W 56/001 |
| 2020/0220703 | A1* | 7/2020 | Kim | H04L 27/26 |
| 2020/0351924 | A1* | 11/2020 | Seo | H04L 5/0053 |
| 2020/0374036 | A1* | 11/2020 | Seo | H04L 5/0048 |
| 2021/0050944 | A1* | 2/2021 | Zhang | H04W 72/04 |
| 2022/0006562 | A1* | 1/2022 | Seo | H04L 27/2649 |

OTHER PUBLICATIONS

CATT: "Further Discussion on NR PDCCH Search Space," 3GPP Draft, 3GPP TSG RAN WG1 Meeting #91, R1-1720191, 3rd Generation Partnership Project (3GPP), Mobile Competence Centre; 650, Route Des Lucioles; F-06921 Sophia-Antipolis Cedex; France vol. RAN WG1, No. Reno, USA; Nov. 27, 2017-Dec. 1, 2017, Nov. 18, 2017 (Nov. 18, 2017), XP051369827, 5 pages, Retrieved from the Internet: URL: http://www.3gpp.org/ftp/tsg%5Fran/WG1%5FRL1/TSGR1%5F91/Docs/ [retrieved on Nov. 18, 2017].

International Preliminary Report on Patentability—PCT/US2018/065266, The International Bureau of WIPO—Geneva, Switzerland, Jul. 23, 2020.

International Search Report and Written Opinion—PCT/US2018/065266—ISA/EPO—Mar. 1, 2019.

LG Electronics: "Remaining Details on Search Space", 3GPP TSG RAN WG1 Meeting 91, 3GPP Draft;R1-1719918, 3rd Generation Partnership Project (3GPP), Mobile Competence Centre; 650, Route Des Lucioles; F-06921 Sophia-Antipolis Cedex; France vol. RAN WG1, No. Reno, USA; Nov. 27, 2017-Dec. 1, 2017, Nov. 18, 2017 (Nov. 18, 2017), XP051369631, pp. 1-4, Retrieved from the Internet: URL:http://www.3gpp.org/ftp/tsg%5Fran/WG1%5FRL1/TSGR1%5F91/Docs/ [retrieved on Nov. 18, 2017], Section 2.2.

AT&T: "SS Block Transmissions in a Wideband CC", 3GPP Draft, 3GPP TSG RAN WG1 Meeting #90, R1-1712696, SS Blocks Wideband, Prague, P.R. Czechia Aug. 21-25, 2017 (Aug. 20, 2017), XP051315509, 2 Pages.

* cited by examiner

PHYSICAL DOWNLINK CONTROL CHANNEL (PDCCH) MONITORING WITH OVERLAPPING RESOURCES

CROSS REFERENCE TO RELATED APPLICATIONS

This application is a continuation of U.S. patent application Ser. No. 16/216,850, filed Dec. 11, 2018, for "PHYSICAL DOWNLINK CONTROL CHANNEL (PDCCH) MONITORING WITH OVERLAPPING RESOURCES" which claims priority to U.S. Provisional Patent Application Ser. No. 62/617,071, filed Jan. 12, 2018, for "PHYSICAL DOWNLINK CONTROL CHANNEL (PDCCH) MONITORING WITH OVERLAPPING RESOURCES," all of which are assigned to the assignee hereof and hereby expressly incorporated by reference herein.

TECHNICAL FIELD

The technology discussed in this disclosure relates generally to wireless communication systems and methods, and more particularly to monitoring for downlink control information (DCI) in a physical downlink control channel (PDCCH). Certain embodiments can enable and provide improved communication techniques for wireless communication devices (e.g., base stations (BSs) and use equipment devices (UEs)) to communicate DCI in PDCCH resources that overlap with resources allocated for preconfigured or scheduled signals.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. An NR network may preconfigure certain resources for transmitting synchronization signals and/or reference signals to facilitate communications in the network. A BS may indicate scheduling grants and/or other information related to DL controls via a PDCCH mapped to resources in a certain region of a transmission slot. In some instances, certain preconfigured resources may overlap with PDCCH resources.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes identifying, by a wireless communication device, a search space set including a plurality of physical downlink control channel (PDCCH) candidate search spaces for a downlink control channel; determining, by the wireless communication device, that a first resource associated with a first PDCCH candidate search space of the plurality of PDCCH candidate search spaces overlaps with a preconfigured resource; and monitoring, by the wireless communication device, for a downlink control message over the downlink control channel by excluding monitoring in at least the first PDCCH candidate search space based on the determining.

In an additional aspect of the disclosure, an apparatus includes a processor configured to identify a search space set including a plurality of physical downlink control channel (PDCCH) candidate search spaces for a downlink control channel; determine that a first resource associated with a first PDCCH candidate search space of the plurality of PDCCH candidate search spaces overlaps with a preconfigured resource; and monitor for a downlink control message over the downlink control channel by excluding monitoring in at least the first PDCCH candidate search space based on the determination.

In an additional aspect of the disclosure, an apparatus includes means for identifying a search space set including a plurality of physical downlink control channel (PDCCH) candidate search spaces for a downlink control channel; means for determining that a first resource associated with a first PDCCH candidate search space of the plurality of PDCCH candidate search spaces overlaps with a preconfigured resource; and means for monitoring for a downlink control message over the downlink control channel by excluding monitoring in at least the first PDCCH candidate search space based on the determination.

In an additional aspect of the disclosure, an apparatus includes a processor configured to obtain search space set including a plurality of physical downlink control channel (PDCCH) candidate search spaces for a downlink control channel, a first PDCCH candidate search space of the plurality of PDCCH candidate search spaces including a first resource overlapping with a preconfigured resource; and monitor for a downlink control message that is encoded based on the preconfigured resource from the downlink control channel in the first PDCCH candidate search space.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
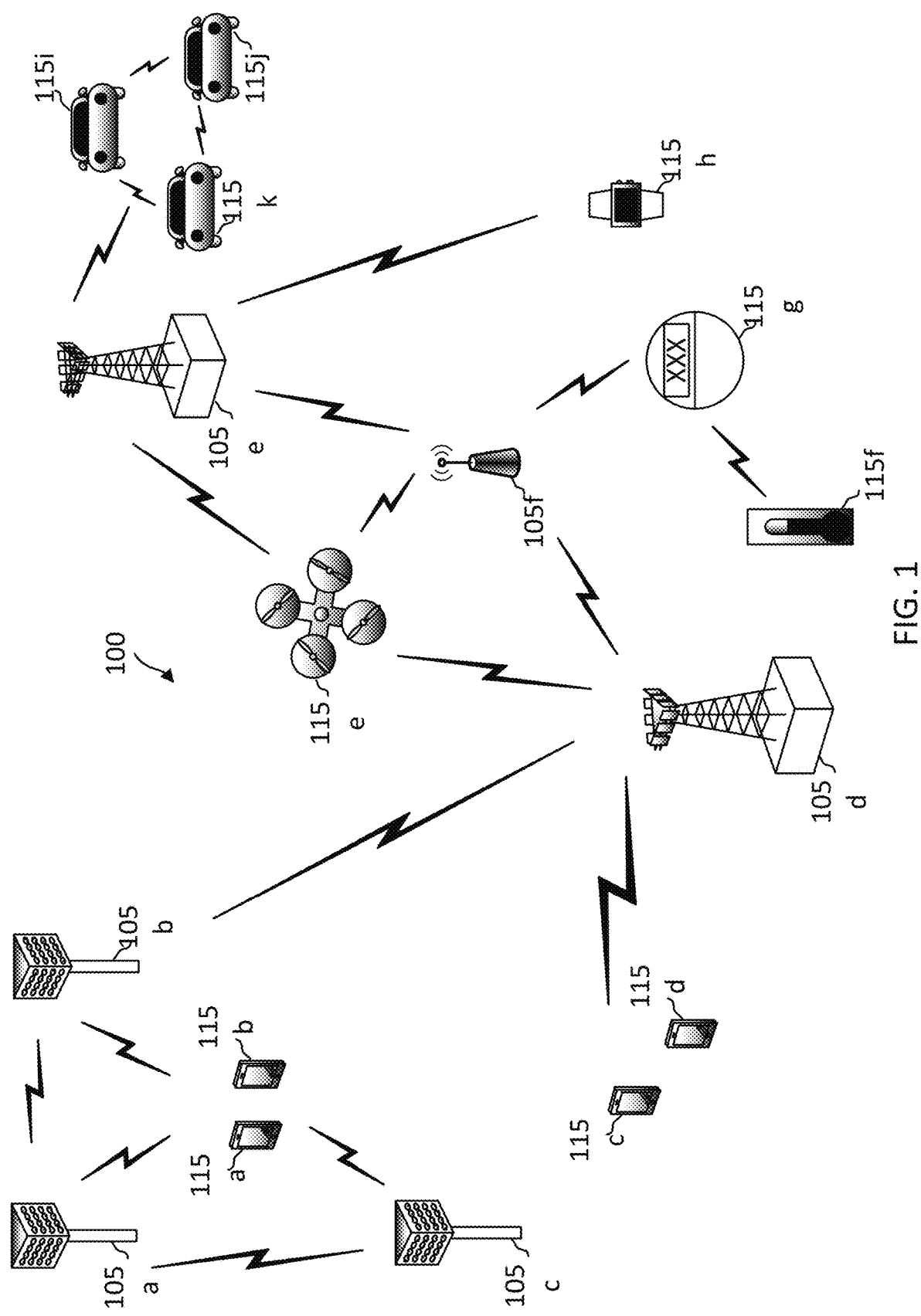
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, orthogonal frequency division multiplexing (OFDM) and the like. UTRA, E-UTRA, and Global System for Mobile Communications (GSM) are part of universal mobile telecommunication system (UMTS). In particular, long-term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long-term evolution LTE is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g.,~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for communicating in a downlink (DL) control channel when the DL control channel is mapped to resources overlapping with resources preconfigured for other signal transmissions. For example, a BS may preconfigure resources for transmitting a synchronization signal, a synchronization signal block (SSB), a reference signal, a broadcast communication signal, a PDSCH signal, a DL data channel signal, and/or any other application-specific signal. The BS may configure a set of resources for transmitting DL control messages. The DL control messages can also be referred to as DL control information (DCI), which may be carried in a physical downlink control channel (PDCCH) that uses the set of resources. The set of resources may be referred to as a control resource set (CORESET). The BS may associate one or more DL control channel candidate search spaces with the CORESET. In other words, a search space corresponds to an instance of the CORESET at a particular time or a particular transmission slot. Each search space may be used to carry a DL control message. A UE may monitor for a DL control message or a PDCCH DCI in each search space. In some instances, a search space may include a resource overlapping with a preconfigured resource. To avoid collisions, the BS may consider the overlapping resource during scheduling. Similarly, the UE may consider the overlapping resource during monitoring.

In one embodiment, a BS may avoid scheduling and transmitting a DL control message in a search space that includes a resource overlapping with a preconfigured resource. In such an embodiment, a UE may exclude monitoring in a search space including an overlapping resource.

In one embodiment, a BS may avoid scheduling and transmitting a DL control message in any search space associated with a CORESET when the CORESET includes a resource overlapping with a preconfigured resource. In such an embodiment, a UE may exclude monitoring in an entire CORESET when the CORESET includes an overlapping resource.

In one embodiment, a BS may schedule and transmit a DL control message in a search space including a resource overlapping with a preconfigured resource. However, the BS may avoid transmitting in the overlapping resource. For example, the BS may encode a DL control message based on a location of the overlapping resource. In such an embodiment, a UE may monitor a search space including a resource overlapping with a preconfigured resource. Upon detecting a signal in the search space, the UE may perform decoding based on a location of the preconfigured resource. In some instances, the BS and the UE may perform rate matching based on the location of the overlapping resource. In some other instances, the BS and the UE may perform puncturing based on the location of the overlapping resources.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a -115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e -115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a -105c may serve the UEs 115a and 115b using 3D beamforming and coordinated spatial techniques, such as coordinated multipoint (CoMP) or multi-connectivity. The macro BS 105d may perform backhaul communications with the BSs 105a -105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource control (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 115 can perform random access procedures to establish a connection with the BS 105.

After establishing a connection, the UE 115 and the BS 105 can enter a normal operation stage, where operational data may be exchanged. For example, the BS 105 may schedule UL and/or DL transmissions by issuing UL transmission grants and/or DL transmission grants for the UE 115. Subsequently, the BS 105 and the UE 115 may communicate based on the issued grants. In an embodiment, a BS 105 may transmit a UL grant and/or a DL grant for a UE 115 in a DL control region of a transmission slot. Subsequently, the BS 105 and the UE 115 may communicate with the UE 115 in a data region of the same transmission slot or a subsequent transmission slot based on the DL grant and/or the UL grant.

In an embodiment, the network 100 may preconfigure resources in certain transmission slots for synchronization signal transmission, PDSCH transmission, broadcast communication transmission, downlink data channel transmission, and/or application-specific signal transmission. Additionally or alternatively, the preconfigured resources configured in certain transmission slots can include SSB transmission to facilitate network discovery and synchronization. An SSB may include a PSS, an SSS, and/or a PBCH. In addition, the network 100 may preconfigure resources in certain transmission slots for reference signal transmissions (e.g., demodulation reference signals (DMRSs) and channel state information-reference signal (CSI-RS)) to facilitate signal communications and channel measurements. Further, the network 100 may preconfigure resources in certain transmission slots for slot format indications, where transmission slots may have various numerologies as described in greater detail herein. The preconfigured resources may overlap with certain regions within the transmission slots. For example, the preconfigured resources may overlap with a DL control channel region of a transmission slot. As such, the BSs 105 may account for DL control resources overlapping with preconfigured resources during DL control channel scheduling. Similarly, the UEs 115 may account for DL control resources overlapping with preconfigured resources during DL control channel monitoring. Mechanisms for DL control channel scheduling and DL control channel monitoring are described in greater detail herein.

Figure 2:
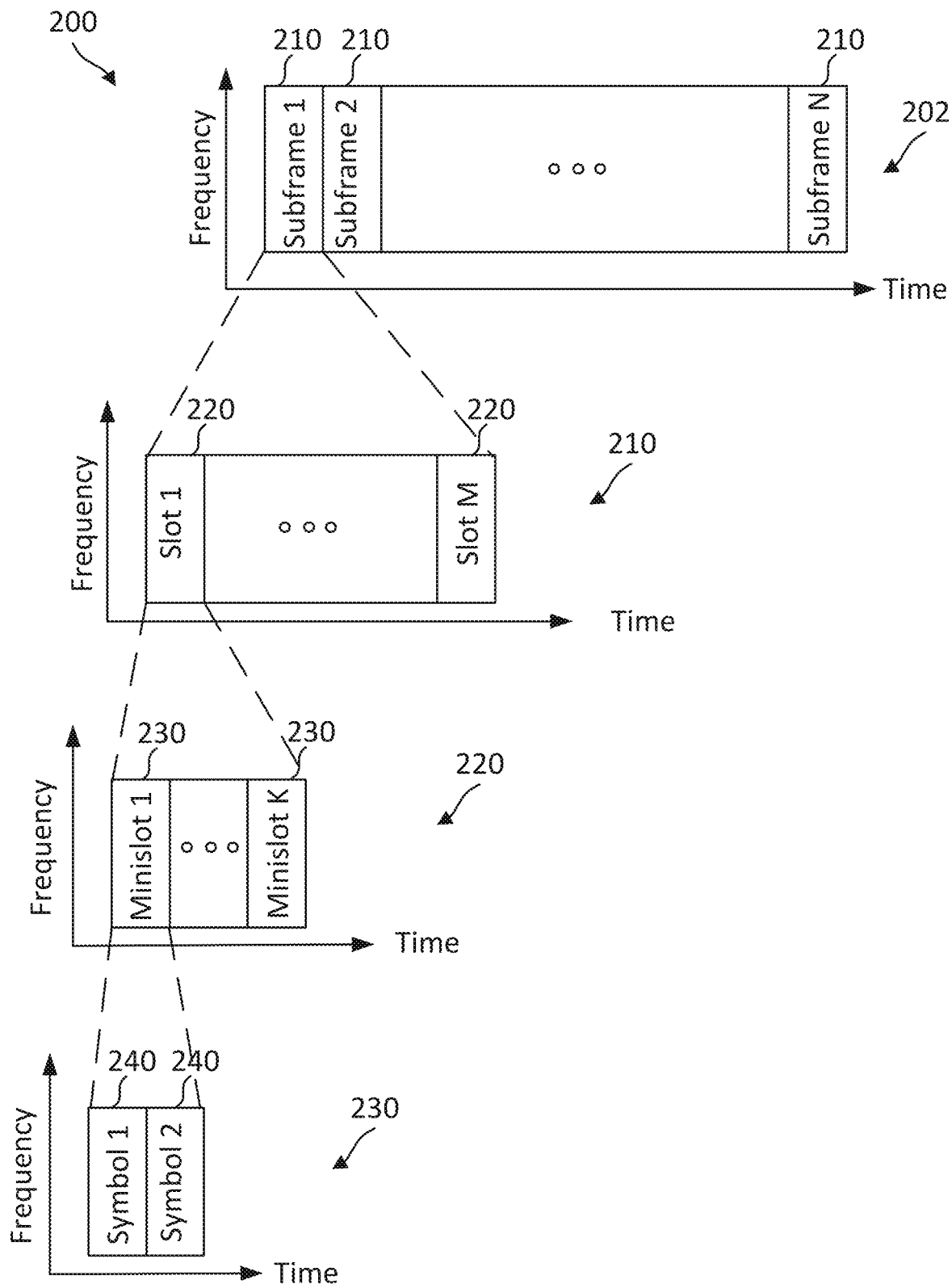
FIG. 2 illustrates a communication frame configuration according to embodiments of the present disclosure.

FIG. 2 illustrates a communication frame configuration 200 according to embodiments of the present disclosure. The configuration 200 may be employed by the networks 100. In particular, BSs such as the BSs 105 and UEs such as the UEs 115 may communicate with each other using the configuration 200. In FIG. 2, the x-axes represent time in some constant units and the y-axes represent frequency in some constant units. The configuration includes a radio frame 202. The radio frame 202 includes N plurality of subframes 210 spanning in time and frequency. In an embodiment, a radio frame 202 may span a time interval of about 10 milliseconds (ms). Each subframe 210 includes M plurality of slots 220. Each slot 220 includes K plurality of mini-slots 230. Each mini-slot 230 may include a variable number of symbols 240. N, M, and K may be any suitable positive integers.

In some embodiments, N may be about 10 and M may be about 14. In other words, a radio frame 202 may include about 10 subframes 210 and each subframe 210 may include about 14 symbols 240. The BSs or the UEs may send data in units of subframes 210, slots 220, or mini-slots 230.

Figure 3:
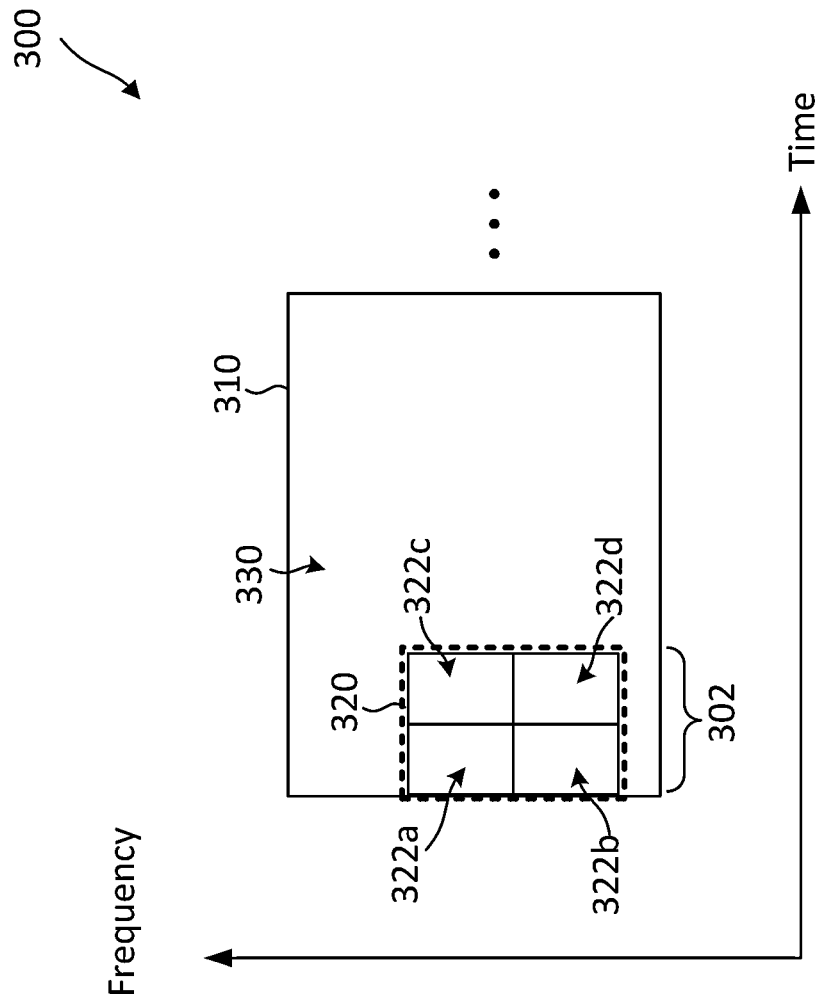
FIG. 3 illustrates a communication frame configuration according to embodiments of the present disclosure.

FIG. 3 illustrates a communication frame configuration 300 according to embodiments of the present disclosure. The configuration 300 may be employed by the networks 100. In particular, BSs such as the BSs 105 and UEs such as the UEs 115 may communicate with each other using the configuration 300. In FIG. 3, the x-axes represent time in some constant units and the y-axes represent frequency in some constant units. The configuration 300 includes a transmission slot 310. The transmission slot 310 may include any suitable number of OFDM symbols (e.g., the OFDM symbols 240). In some instances, the transmission slot 310 may correspond to to slot 220. In some other instances, the transmission slot 310 may correspond to a mini-slot 230. The transmission slot 310 may be referred to as a transmission time interval (TTI). A BS or a UE may encapsulate information data from a higher layer into a frame (e.g., a transport block (TB)) and transmit the frame in the transmission slot 310.

The transmission slot 310 may include a DL control region 302. The DL control region 302 may include a set of resources 320 spanning in time and frequency designated for DCI transmissions. For example, the set of resources 320 may span a number of frequency subcarriers in frequency and a number of OFDM symbols in time. In some instances, when the transmission slot 310 corresponds to a slot 220, the DL control region 302 may be located at the beginning of the slot 220 and may include a duration of about 2 symbols to about 3 symbols. In some other instances, when the transmission slot 310 corresponds to a mini-slot 230 within a slot 220, the DL control region 302 may be located at any symbol within the slot 220. DCI may include UL scheduling grants and/or DL scheduling grants. A scheduling grant may include a modulation and coding scheme (MCS), a rank indicator (RI), a precoding matrix indicator (PMI), a resource allocation, and/or any information related to a corresponding scheduled transmission. The remaining time-frequency resources 330 may be allocated for a physical downlink shared channel (PDSCH) transmission (e.g., carrying DL data) or a physical uplink shared channel (PUSCH) transmission (e.g., carrying UL data).

The set of resources 320 may be referred to as a CORESET. Accordingly, in some instances, a CORESET can include a number of RBs in the frequency domain and a number of symbols in the time domain. A plurality of DL control channel search spaces 322 may be mapped to the CORESET 320. The search spaces 322 are shown as 322*a*, 322*b*, 322*c*, and 322*d*. Each DL control channel search space 322 may carry a physical downlink control channel (PDCCH) candidate (e.g., DCI or a DL control message). In some embodiments, the search spaces 322 may be periodic.

For example, the search space 322a may be configured for a particular slot 310 and repeated at every L number of slots 310, where L may be any suitable integer. In other words, the search space 322a correspond to time instances of the CORESET 320 where a PDCCH search may be performed by a UE. Accordingly, in some instances, a set of PDCCH candidates for a UE to monitor is defined in terms of PDCCH search space sets. The UE may monitor PDCCH for each search space set (e.g., the search spaces 322a, 322b, 322c, and 322d) in a CORESET.

While FIG. 3 illustrates each search space 322 mapped to a different portion of the CORESET 320, in some embodiments, two search spaces 322 may be partially overlapping.

Figure 4:
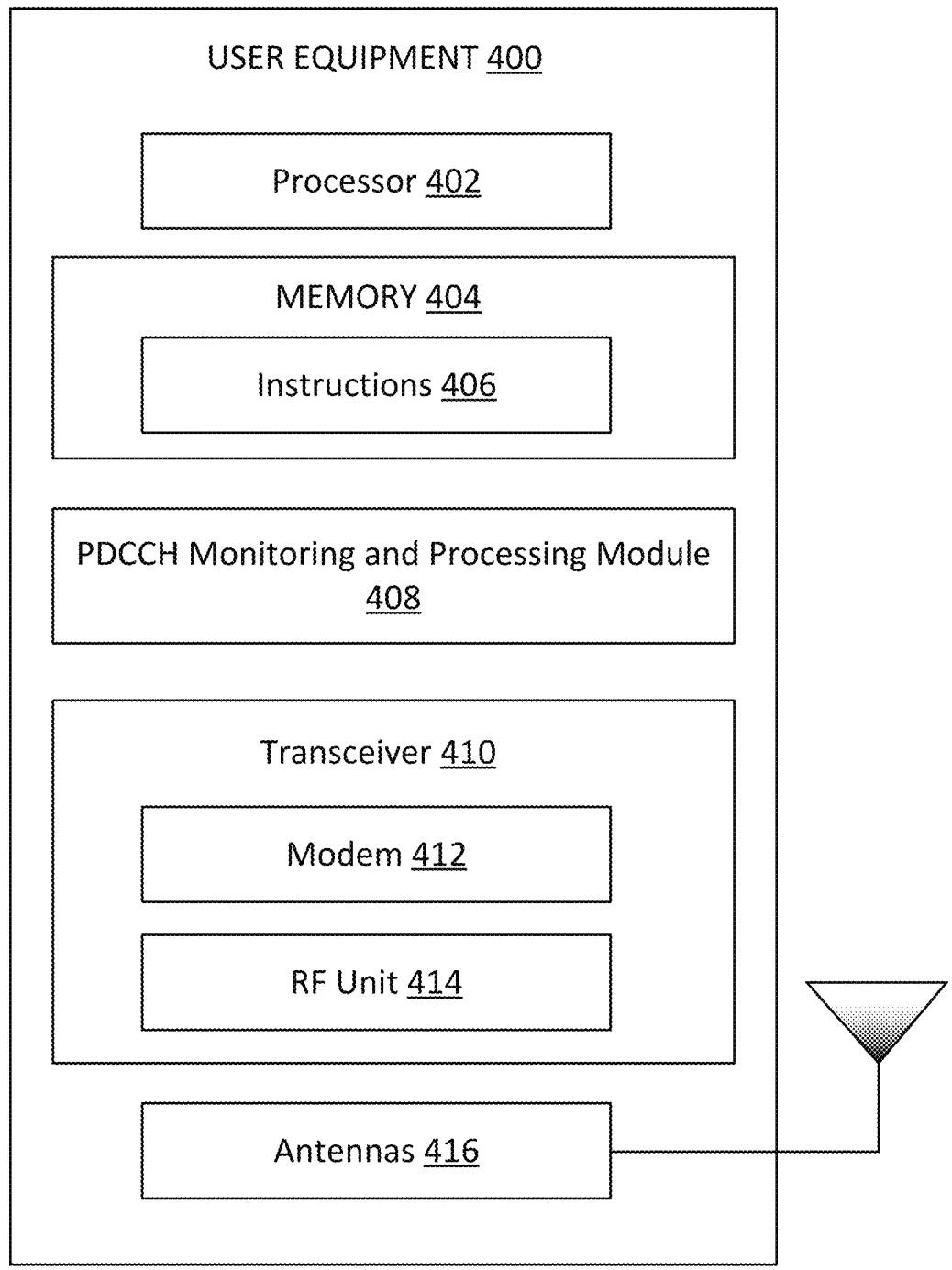
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a PDCCH monitoring and processing module 408, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PDCCH monitoring and processing module 408 may be implemented via hardware, software, or combinations thereof. For example, the PDCCH monitoring and processing module 408 may be implemented as a processor, circuit, and/or instructions 406 stored in the memory 404 and executed by the processor 402. In some examples, the PDCCH monitoring and processing module 408 can be can be integrated within the modem subsystem 412. For example, the PDCCH monitoring and processing module 408 can be implemented by a combination of software components (e.g., executed by a DSP or a general processor) and hardware components (e.g., logic gates and circuitry) within the modem subsystem 412. The PDCCH monitoring and processing module 408 may be used for various aspects of the present disclosure. For example, the PDCCH monitoring and processing module 408 is configured to receive configurations from a BS (e.g., the BSs 105), obtain a CORESET (e.g., the CORESET 320) from the configurations, obtain PDCCH candidate search spaces (e.g., the search spaces 322) from the configurations, obtain preconfigured resources from the configurations, monitor for PDCCH candidates and process received PDCCH signals based on the obtained CORESET, search spaces, and/or preconfigured resources, and/or apply rate matching or puncturing around resources overlapping with preconfigured resources as described in greater detail herein. In some instances, each PDCCH candidate search space may be referred to as a PDCCH candidate, and the set of PDCCH candidates within an instance of a CORESET may be referred to as a search space set or a search space.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, and/or the PDCCH monitoring and processing module 408 according to a MCS, e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
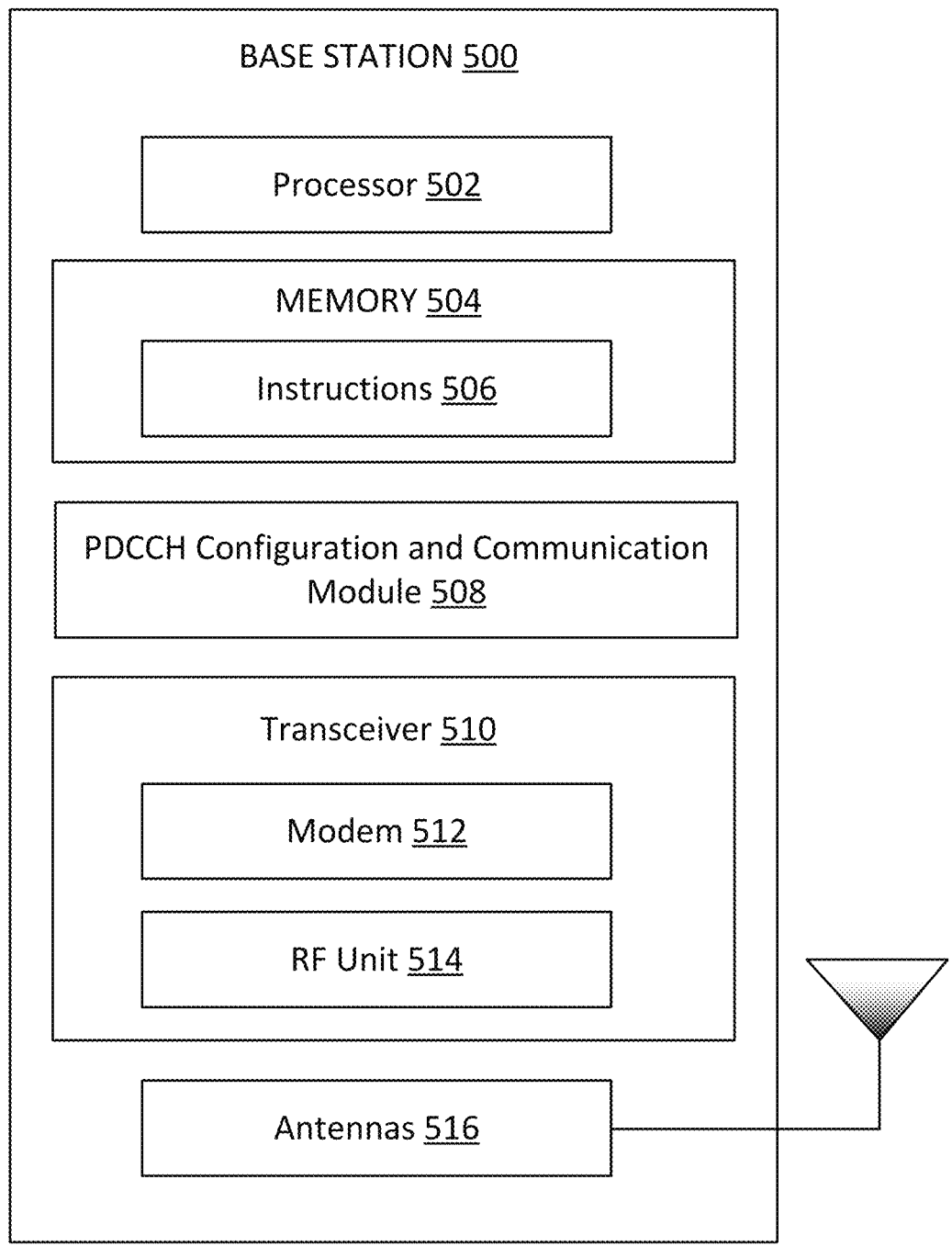
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above. A shown, the BS 500 may include a processor 502, a memory 504, a PDCCH configuration and communication module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein. Instructions 506 may also be referred to as code, which may be interpreted broadly to include any type of computer-readable statement(s) as discussed above with respect to FIG. 5.

The PDCCH configuration and communication module 508 may be implemented via hardware, software, or combinations thereof. For example, the PDCCH configuration and communication module 508 may be implemented as a processor, circuit, and/or instructions 506 stored in the memory 504 and executed by the processor 502. In some examples, the PDCCH configuration and communication module 508 can be can be integrated within the modem subsystem 512. For example, the PDCCH configuration and communication module 508 can be implemented by a combination of software components (e.g., executed by a DSP or a general processor) and hardware components (e.g., logic gates and circuitry) within the modem subsystem 512. The PDCCH configuration and communication module 508 may be used for various aspects of the present disclosure. For example, the PDCCH configuration and communication module 508 is configured to transmit configurations for a CORESET (e.g., the CORESET 320), PDCCH candidate search spaces (e.g., the search spaces 322), and/or preconfigured resources, schedule and transmit DCI based in the search spaces, and/or apply rate matching or puncturing around resources overlapping with preconfigured resources as described in greater detail herein. In some instances, each PDCCH candidate search space may be referred to as a PDCCH candidate, and the set of PDCCH candidates within an instance of a CORESET may be referred to as a search space set or a search space.

As shown, the transceiver 510 may include the modem subsystem 512 and the RF unit 514. The transceiver 510 can be configured to communicate bi-directionally with other devices, such as the UEs 115 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of PDCCH signals according to embodiments of the present disclosure. The antennas 516 may further receive data messages transmitted from other devices and provide the received data messages for processing and/or demodulation at the transceiver 510. The antennas 516 may include multiple antennas of similar or different designs in order to sustain multiple transmission links.

FIGS. 6-9 illustrate various mechanisms that can be used for DCI communications between BSs (e.g., the BSs 105 and 500) and UEs (e.g., the UEs 115 and 400). In FIGS. 6-9, the x-axes represent time in some constant units and the y-axes represent frequency in some constant units.

Figure 6:
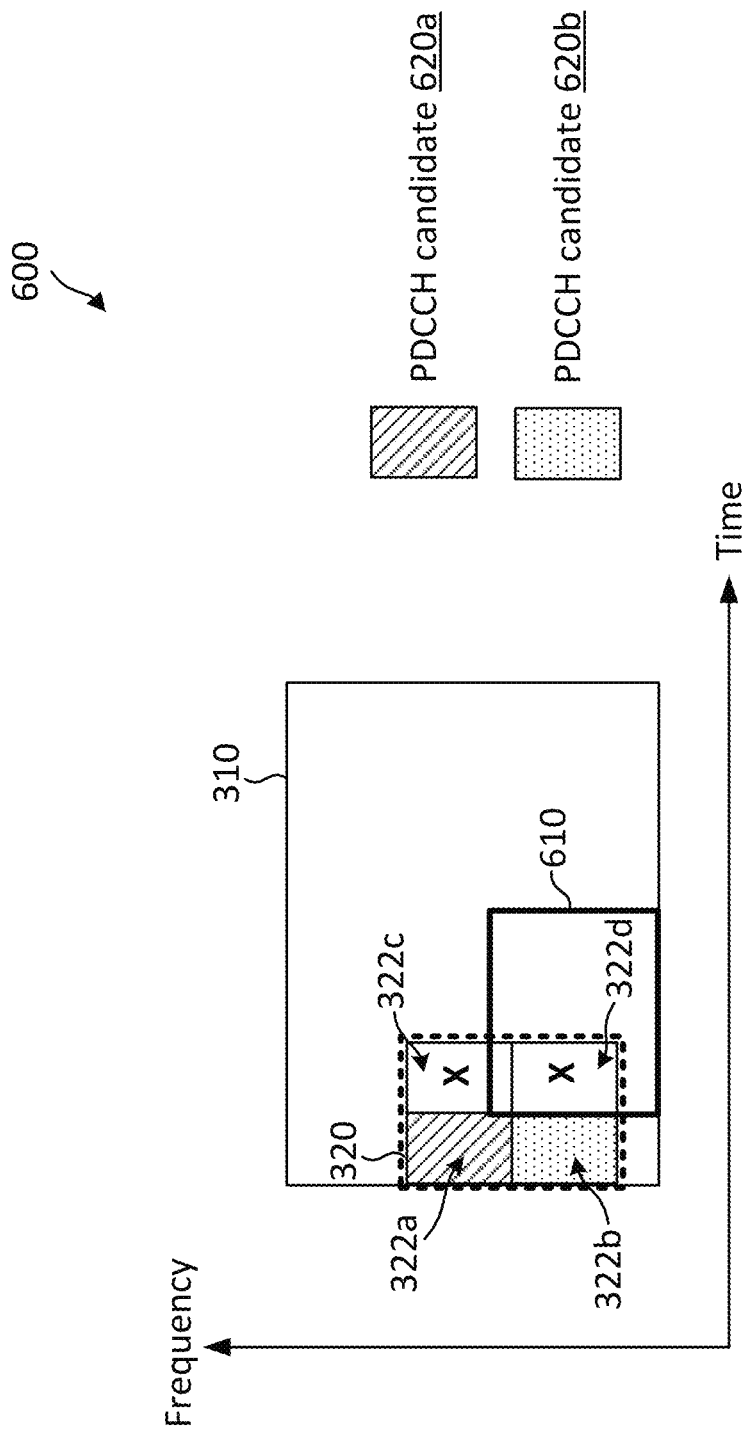
FIG. 6 illustrates a downlink (DL) control channel communication method according to embodiments of the present disclosure.

FIG. 6 illustrates a DL control channel communication method 600 according to embodiments of the present disclosure. The method 600 may be employed by the BSs 105 and 500 and the UEs 115 and 400. The method 600 is illustrated using the frame configuration 300 described above with respect to FIG. 3. As shown in FIG. 6, the transmission slot 310 further includes a resource 610 pre-configured for a particular signal transmission, such as a synchronization signal transmission, a reference signal transmission, a PDSCH transmission, and/or an application-specific signal transmission. The synchronization signal may include an SSB including a PSS, an SSS, a PBCH, and/or a PBCH DMRS. The reference signal may be a DMRS or a CSI-RS. The resource 610 may be semi-statically or dynamically configured. A BS may pre-allocate, reserve, or pre-schedule the resource 610 and indicate a configuration of the resource 610 to a UE. For example, the BS may indicate a semi-statically configured resource 610 via a RRC message. Alternatively, a BS may indicate a dynamically configured resource 610 via DCI.

In the method 600, a BS may transmit a DL control message over a search space 322 that do not overlap with any portions of the preconfigured resource 610. Similarly, a UE may monitor for a PDCCH candidate in a search space 322 that do not overlap with any portions of the preconfigured resource 610. As an example, at least a portion of the search spaces 322c and 322d overlap with a portion of the resource 610. Thus, a BS may transmit a PDCCH candidate 620a in the search space 322a and/or a PDCCH candidate 620b in the search space 322b, but may refrain from transmitting a PDCCH candidate in any of the search spaces 322c and 322d (as shown by the cross symbols). Similarly, a UE may exclude PDCCH monitoring in the search spaces 322c and 322d. Accordingly, in some instances, when at least one resource element (RE) (e.g., a frequency subcarrier) for a PDCCH candidate (e.g., the search space 322c and 322d) overlaps with at least one RE corresponding to an SSB (e.g., in the preconfigured resource 610), the UE is not required to monitor the PDCCH candidate. Additionally, the search spaces 322a -322d can be referred to as PDCCH candidate search spaces and/or a search space set. In some instances, each PDCCH candidate search space may be referred to as a PDCCH candidate, and the set of PDCCH candidates within an instance of a CORESET may be referred to as a search space set or a search space.

Figure 7:
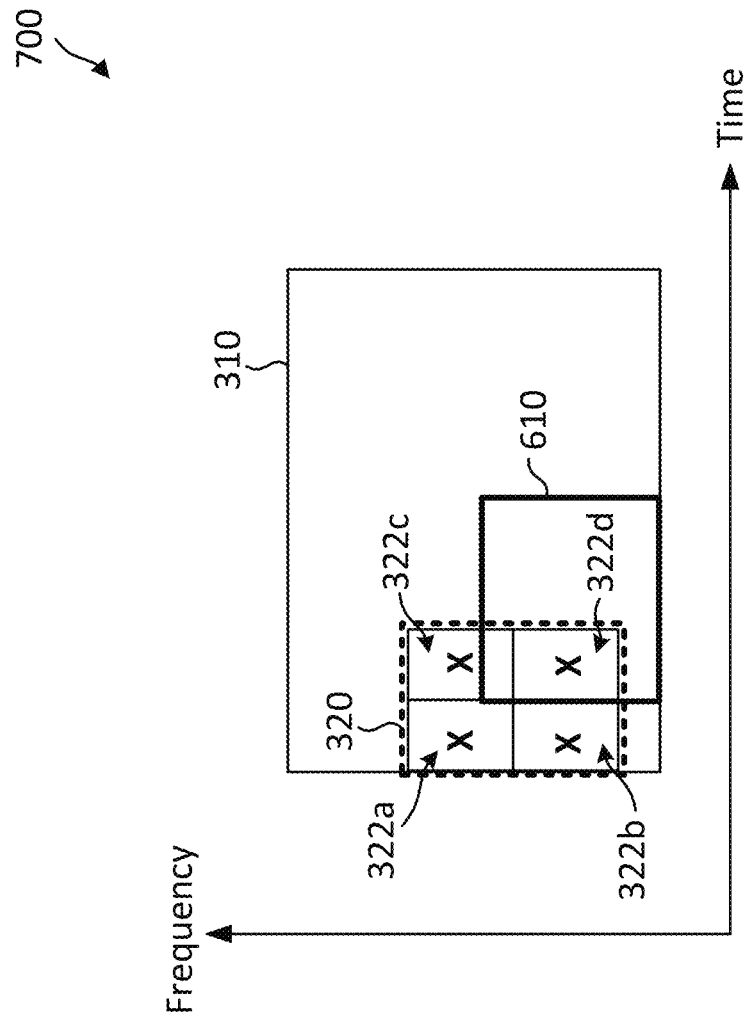
FIG. 7 illustrates a DL control channel communication method according to embodiments of the present disclosure.

FIG. 7 illustrates a DL control channel communication method 700 according to embodiments of the present disclosure. The method 700 may be employed by the BSs 105 and 500 and the UEs 115 and 400. The method 700 is illustrated using the frame configuration 300 described above with respect to FIG. 3. Similar to the method 600, the transmission slot 310 includes a preconfigured resource 610 including portions overlapping with the search spaces 322c and 322*d*. However, in the method 700, a BS may refrain from transmitting a DL control message over any search space 322 associated with the CORESET 320 (as shown by the cross symbols) when the CORESET 320 in the transmission slot 310 overlaps with the preconfigured resource 610. Thus, a UE may exclude monitoring in the entire CORESET 320 within the transmission slot 310 when the CORESET 320 overlaps with the preconfigured resource 610.

In some embodiments, the transmission slot 310 may include multiple CORESETs 320. When one of the CORESETs 320 overlaps with a preconfigured resource 610, search spaces 322 that are associated with the other CORESETs 320 in the transmission slot may be used for DL control message transmissions and/or monitoring.

Figure 8:
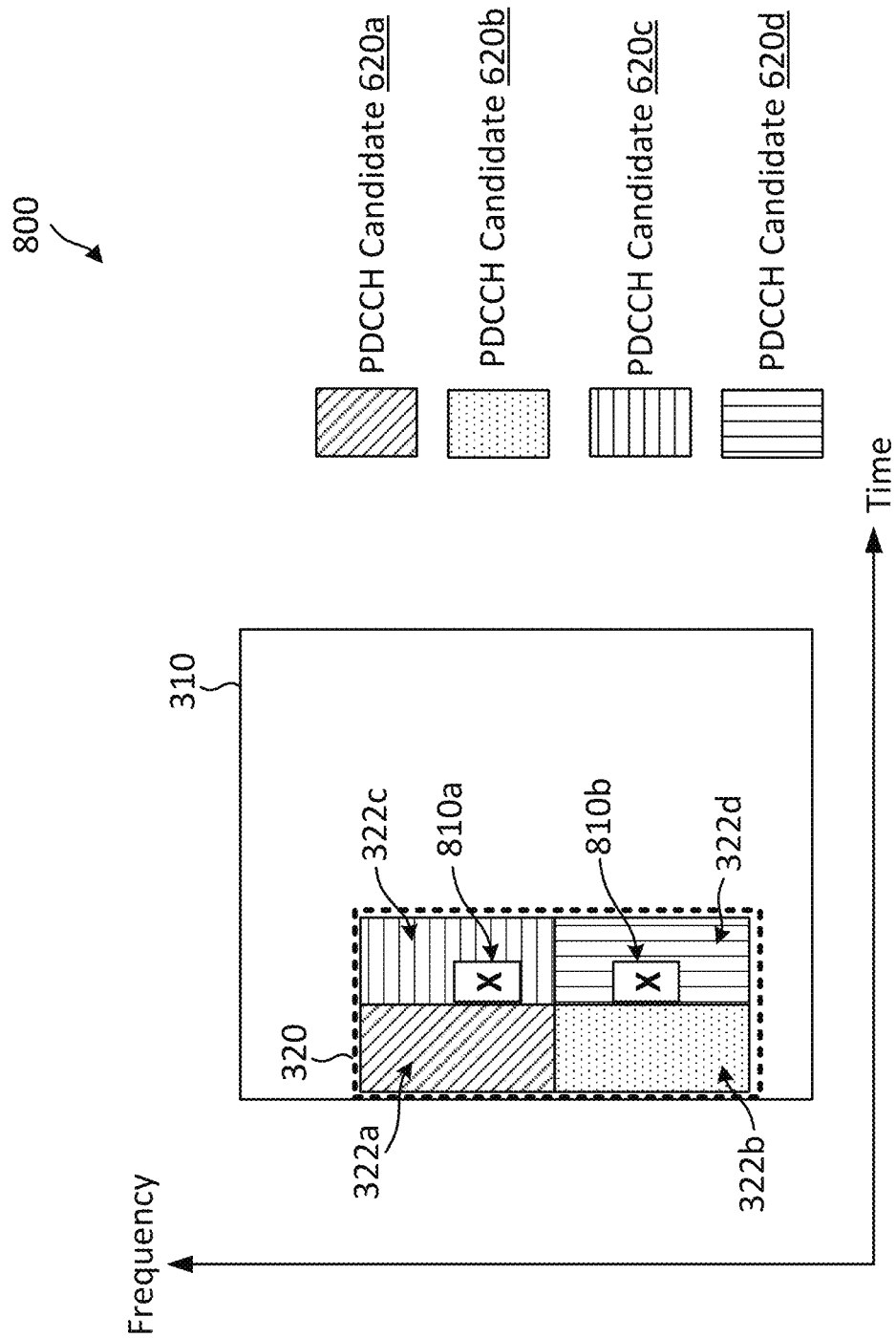
FIG. 8 illustrates a DL control channel communication method according to embodiments of the present disclosure.

FIG. 8 illustrates a DL control channel communication method 800 according to embodiments of the present disclosure. The method 800 may be employed by the BSs 105 and 500 and the UEs 115 and 400. The method 800 is illustrated using the frame configuration 300 described above with respect to FIG. 3. As shown, the transmission slot 310 includes resources 810 preconfigured, scheduled, or reserved for a particular signal transmission, such as a synchronization signal transmission, a reference signal transmission, and/or a PDSCH transmission. For example, the resource 810*a* is within the search space 322*c* and the resource 810*b* is within the search space 322*d*.

In the method 800, a BS may transmit a PDCCH candidate 620*c* in the search space 322*c* and/or a PDCCH candidate 620*d* in the search space 322*d* while the search spaces 322*c* and 322*d* include resources overlapping with the preconfigured resources 810*a* and 810*b*, respectively. However, the BS may refrain from transmitting in the overlapping resources 810*a* and 810*b* as shown by the cross symbols. For example, the BS may encode a DL control message by performing rate matching to account for the resource 810*a*. Rate matching may include a bit selection step that selects or extracts a number of encoded bits to fit into an assigned physical resource. In some embodiments, rate matching may further include sub-block interleaving and a bit collection step prior to the bit selection step similar to PDSCH rate matching. The BS may transmit the encoded DL control message (e.g., a PDCCH candidate 620*c*) in the search space 322*c* excluding the resource 810*a*.

Similarly, a UE may monitor all the search spaces 322 in the CORESET 320 irrespective of whether a search space 322 overlaps with the resource 810*a* or 810*b*. When the UE detects a PDCCH signal (e.g., the PDCCH candidate 620*c*) from the search space 322*c* overlapping with the preconfigured resource 810*a*, the UE may perform decoding by rate matching to account for the preconfigured resource 810*a* (e.g., excluding the preconfigured resource 810*a*).

Figure 9:
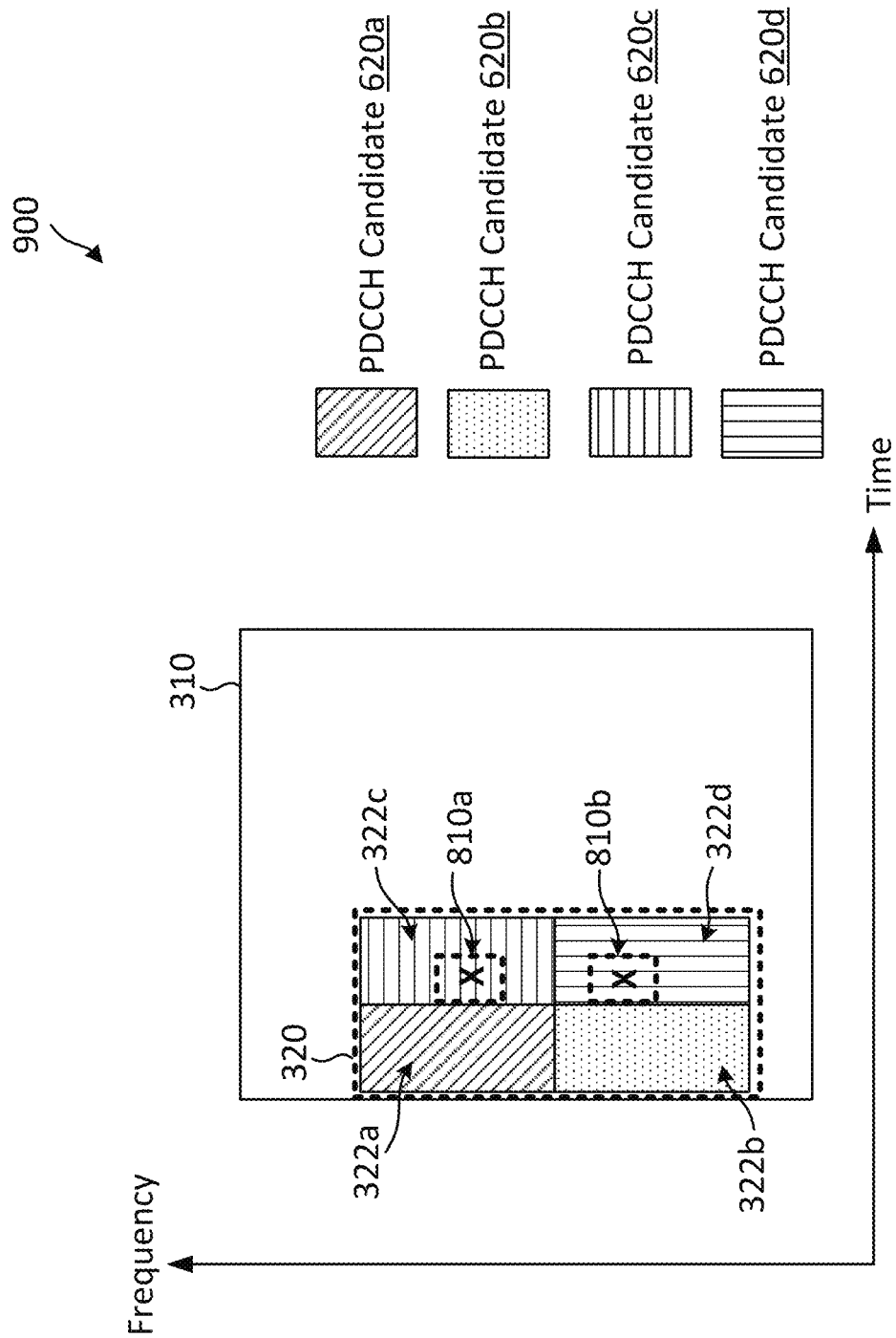
FIG. 9 illustrates a DL control channel communication method according to embodiments of the present disclosure.

FIG. 9 illustrates a DL control channel communication method 900 according to embodiments of the present disclosure. The method 900 may be employed by the BSs 105 and 500 and the UEs 115 and 400. The method 900 is illustrated using the frame configuration 300 described above with respect to FIG. 3. Similar to the method 800, a BS may transmit a PDCCH candidate 620*c* in the search space 322*c* and/or a PDCCH candidate 620*d* in the search space 322*d* when the search spaces 322*c* and 322*d* include portions overlapping with the preconfigured resources 810*a* and 810*b*, respectively. However, in the method 900, the BS may apply puncturing to drop certain number of bits to account for the overlapping preconfigured resources 810*a* and/or 810*b* such that transmissions in the overlapping preconfigured resources 810*a* and/or 810*b* may be avoided as shown by the cross symbols.

Similarly, the UE may monitor all the search spaces 322 in the CORESET 320 irrespective of whether a search space 322 overlaps with the resource 810*a* or 810*b*. When the UE detects a PDCCH signal (e.g., the PDCCH candidate 620*c*) from the search space 322*c* including the preconfigured resource 810*a*, the UE may perform decoding by applying puncturing (e.g., dropping bits) to account for the preconfigured resource 810*a*.

Figure 10:
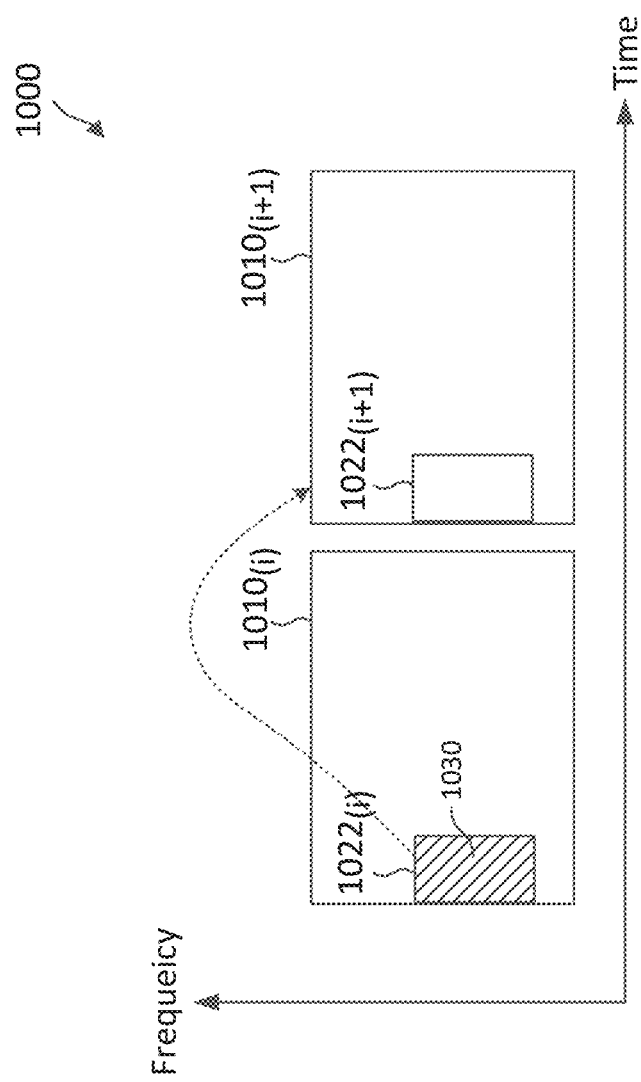
FIG. 10 illustrates a resource configuration scenario according to embodiments of the present disclosure.

FIG. 10 illustrates a resource configuration scenario 1000 according to embodiments of the present disclosure. In FIG. 10, the x-axis represents time in some constant units and the y-axis represents frequency in some constant units. The scenario 1000 may correspond to a DL scheduling scenario in the network 100. The scenario 1000 includes two transmission slots 1010 similar to the transmission slot 310. The transmission slots 1010 are shown as $1010_{(i)}$ and $1010_{(i+1)}$. Each slot 1010 includes a search space 1022 similar to the search spaces 322. A BS (e.g., the BSs 105 and 500) may transmit DCI 1030 in the search space $1022_{(i)}$ of the current transmission slot $1010_{(i)}$, where i may be any positive integer. The DCI 1030 may include a DL transmission grant for a UE (e.g., the UEs 115 and 400) in a next transmission slot $1010_{(i+1)}$ as shown by the dotted arrow. For example, the DCI 1030 may include a DCI parameter (e.g., K0) set to a value of 1 to indicate a pre-schedule for the next transmission slot $1010_{(i+1)}$. Subsequently, the BS may transmit a DL data signal (e.g., a PDSCH transmission) to the UE in the transmission slot $1010_{(i+1)}$ based on the DCI 1030. The BS may configure the UE to monitor for PDCCH candidates using any of the methods 600, 700, 800, 900, 1200, 1300, 1400, and/or 1500. Subsequently, the BS may transmit PDCCH signals based on the configuration and the UE may perform PDCCH monitoring based on the configuration. While FIG. 10 illustrates scheduling in advance by one transmission slot 1010, similar mechanisms may be employed to schedule transmissions in advance any suitable number of slots (e.g., about 2 or 3).

Figure 11:
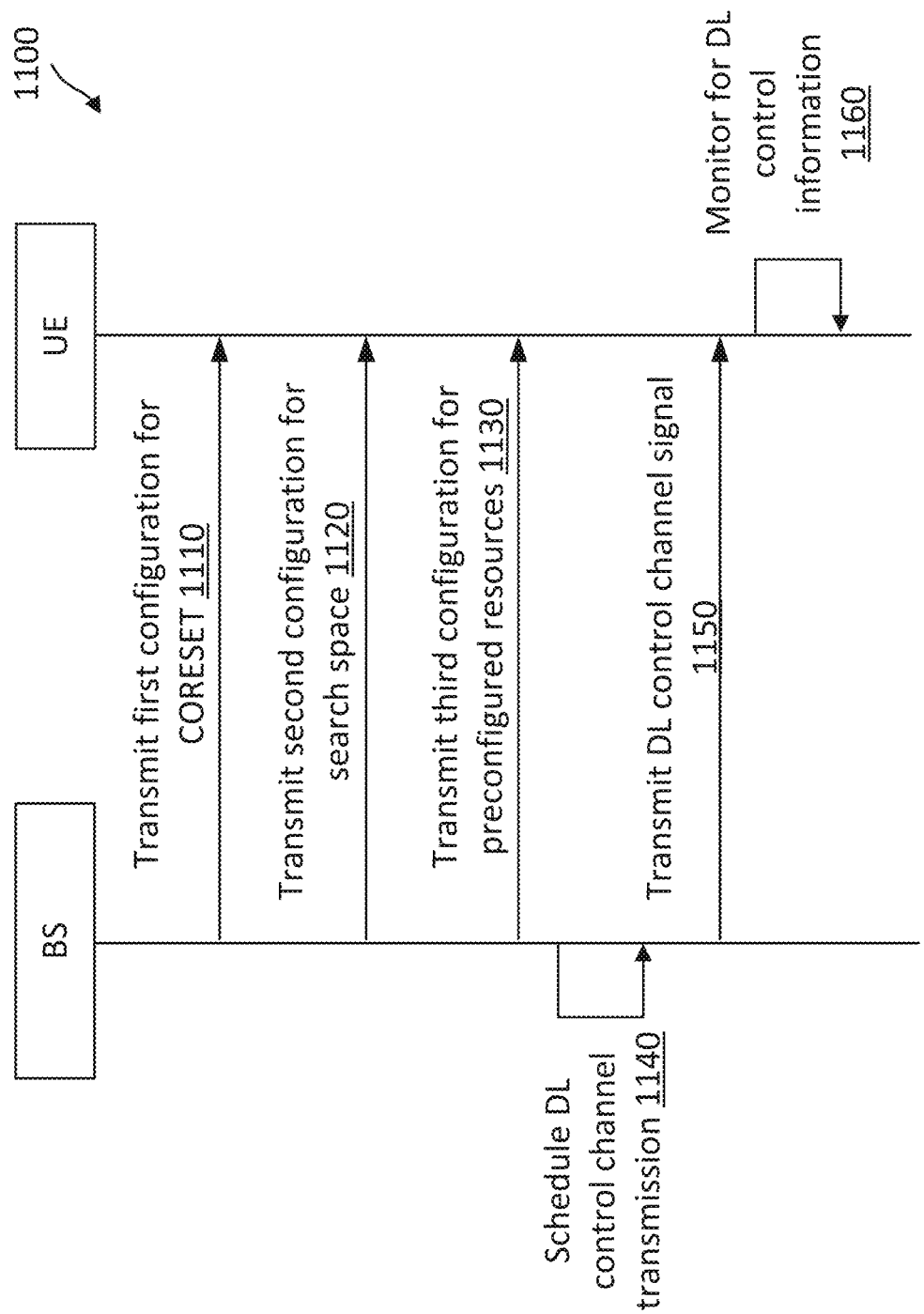
FIG. 11 is a signaling diagram of a communication method according to some embodiments of the present disclosure.

FIG. 11 is a signaling diagram of a communication method 1100 according to some embodiments of the present disclosure. The method 1100 is implemented by a BS (e.g., the BSs 105 and 500) and a UE (e.g., the UEs 115 and 400) in a network (e.g., the network 100). The method 1100 may employ similar mechanisms as in the methods 600, 700, 800, and 900, 1200, 1300, 1400, and/or 1500 and/or the scenario 1000 described with respect to FIGS. 6, 7, 8, 9, and 10. Steps of the method 1100 can be executed by computing devices (e.g., a processor, processing circuit, and/or other suitable component) of the BS and the UE. As illustrated, the method 1300 includes a number of enumerated steps, but embodiments of the method 1100 may include additional steps before, after, and in between the enumerated steps. In some embodiments, one or more of the enumerated steps may be omitted or performed in a different order.

At step 1110, the BS transmits a first configuration for a CORESET (e.g., the CORESET 320).

At step 1120, the BS transmits a second configuration for a plurality of search spaces (e.g., the search spaces 322 and 1022). The search spaces may be mapped to the CORESET as shown in the methods 600, 700, 800, and 900.

At step 1130, the BS transmits a third configuration for preconfigured resources, for example, allocated for SSB transmissions, reference signal transmissions, and/or PDSCH transmissions. The BS may transmit the first configuration, the second configuration, and/or the third configuration via RRC messages or DCI (e.g., the PDCCH candidates 620 and the DCI 1030).

At step 1140, the BS may schedule a DL control channel transmission, for example, in a transmission slot 310 or 1010. The BS may account for resources (e.g., the resources 610 and 810) overlapping with the search spaces using the method 600, 700, 800, or 900.

At step 1150, the BS may transmit a DL control message based on the schedule.

At step 1160, the UE may monitor for a DL control message or a PDCCH candidate using the method 600, 700, 800, 900, 1200, 1300, 1400, and/or 1500, for example, depending on a predetermined configuration. For example, the UE and the BS may be configured to use the same method (e.g., the method 600, 700, 800, 900, 1200, 1300, 1400, and/or 1500) to resolve conflicts in resource allocations configured or indicated via different messages.

Figure 12:
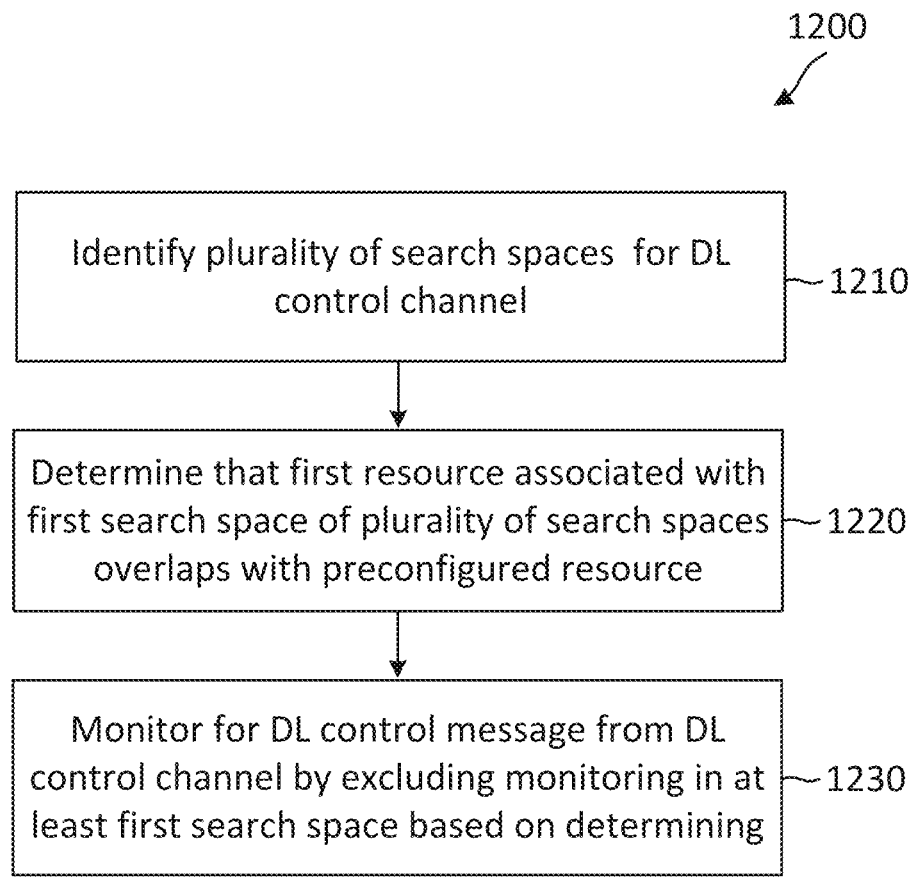
FIG. 12 is a flow diagram of a DL control channel monitoring method according to embodiments of the present disclosure.

FIG. 12 is a flow diagram of a DL control channel monitoring method 1200 according to embodiments of the present disclosure. Steps of the method 1200 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PDCCH monitoring and processing module 408, the transceiver 410, and the one or more antennas 416, to execute the steps of method 1200. The method 1200 may employ similar mechanisms as in the method 600, 700, and/or 1100 described with respect to FIGS. 6, 7, and/or 11, respectively. As illustrated, the method 1200 includes a number of enumerated steps, but embodiments of the method 1200 may include additional steps before, after, and in between the enumerated steps. In some embodiments, one or more of the enumerated steps may be omitted or performed in a different order.

At step 1210, the method 1200 includes identifying a plurality of search spaces (e.g., the search spaces 322 and 1022) for a DL control channel (e.g., a PDCCH). In some instances, each search space of the plurality of search spaces can be referred to as a PDCCH candidate search space within a search space set. Each PDCCH candidate search space may be referred to as a PDCCH candidate or a PDCCH candidate search space. The search space set can be referred to as an instance of a CORESET.

At step 1220, the method 1200 includes determining that a first resource associated with a first search space (e.g., the search spaces 322c, 322d, and 1022$_{(i+1)}$ of the plurality of search spaces overlaps with a preconfigured resource (e.g., the resources 610 and 810).

At step 1230, the method 1200 includes monitoring for a DL control message (e.g., the PDCCH candidates 620 and the DCI 1030) over the DL control channel by excluding monitoring in at least the first search space based on the determining.

In an embodiment, the wireless communication device can determine that resources of a second search space (e.g., the search spaces 322a and 322b) of the plurality of search spaces does not overlap with any preconfigured resources and the monitoring can include monitoring for the DL control message from the second search space, for example, as shown in the method 600.

In another embodiment, the wireless communication device may further determine whether the plurality of resources is associated with a set of control resources (e.g., the CORESET 320) including the first resource overlapping with the first resource. The wireless communication device may exclude monitoring in any of the plurality of search spaces when the plurality of search spaces is determined to be associated with the set of control resources, for example, as shown in the method 700.

In an embodiment, the wireless communication device can receive a configuration indicating the preconfigured resource allocated for a transmission of at least one of a synchronization signal, a reference signal, or a downlink data channel signal (e.g., a PDSCH signal).

Figure 13:
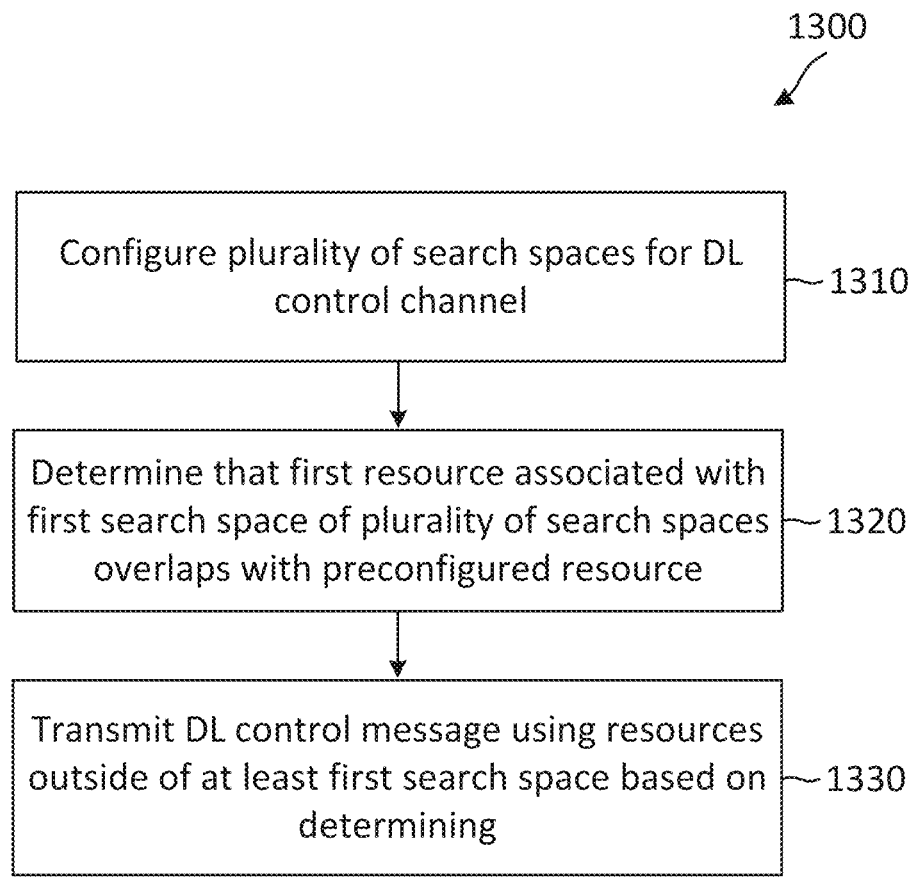
FIG. 13 is a flow diagram of a DL control channel transmission method according to embodiments of the present disclosure.

FIG. 13 is a flow diagram of a DL control channel transmission method 1300 according to embodiments of the present disclosure. Steps of the method 1300 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the PDCCH configuration and communication module 508, the transceiver 510, and the one or more antennas 516, to execute the steps of method 1300. The method 1300 may employ similar mechanisms as in the method 600, 700, and/or 1100 described with respect to FIGS. 6, 7, and/or 11, respectively. As illustrated, the method 1300 includes a number of enumerated steps, but embodiments of the method 1300 may include additional steps before, after, and in between the enumerated steps. In some embodiments, one or more of the enumerated steps may be omitted or performed in a different order.

At step 1310, the method 1300 includes configuring a plurality of search spaces (e.g., the search spaces 322 and 1022) for a DL control channel (e.g., a PDCCH). In some instances, each search space of the plurality of search spaces can be referred to as a PDCCH candidate search space within a search space set. Each PDCCH candidate search space may be referred to as a PDCCH candidate or a PDCCH candidate search space. The search space set can be referred to as an instance of a CORESET.

At step 1320, the method 1200 includes determining that a first resource associated with a first search space (e.g., the search spaces 322c, 322d, and 1022$_{(i+1)}$ of the plurality of search spaces overlaps with a preconfigured resource (e.g., the resources 610 and 810).

At step 1330, the method 1300 includes transmitting a DL control message (e.g., the PDCCH candidates 620 and the DCI 1030) using resources outside of at least the first search space based on the determining.

In an embodiment, the wireless communication device may transmit the DL control message in a second search space (e.g., the search spaces 322a and 322b) of the plurality of search spaces that is non-overlapping with any preconfigured resources for example, as shown in the method 600.

In another embodiment, the wireless communication device may further determine whether the plurality of resources is associated with a set of control resources (e.g., the CORESET 320) including the first resource overlapping with the first resource. The wireless communication device may refrain from transmitting a DL control message in any of the plurality of search spaces when the plurality of search spaces is determined to be associated with the set of control resources, for example, as shown in the method 700.

In an embodiment, the wireless communication device can transmit a configuration indicating the preconfigured resource allocated for a transmission of at least one of a synchronization signal, a reference signal, or a downlink data channel signal (e.g., a PDSCH signal).

Figure 14:
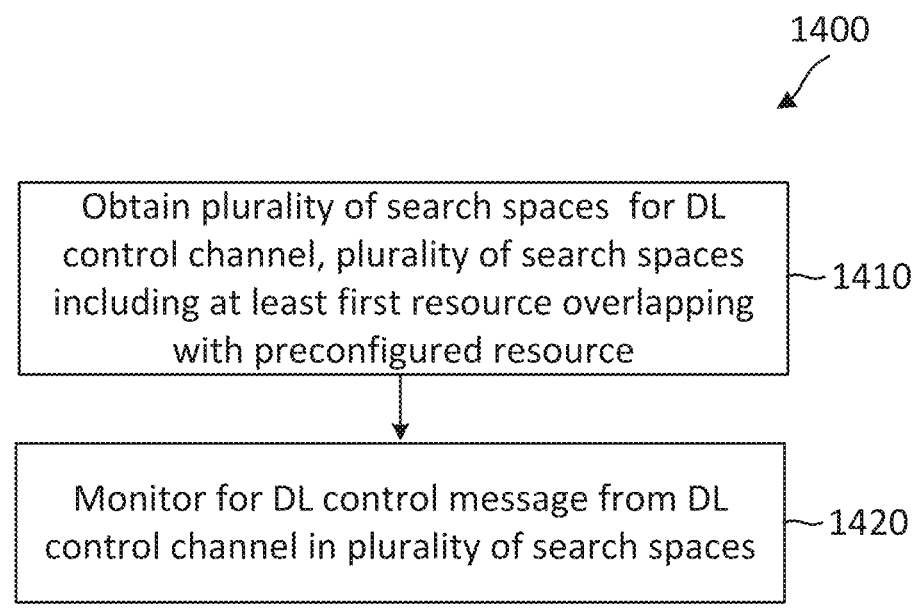
FIG. 14 is a flow diagram of a DL control channel monitoring method according to embodiments of the present disclosure.

FIG. 14 is a flow diagram of a DL control channel monitoring method 1400 according to embodiments of the present disclosure. Steps of the method 1400 can be executed by a computing device (e.g., a processor, processing circuit, and/or other suitable component) of a wireless communication device or other suitable means for performing the steps. For example, a wireless communication device, such as the UE 115 or UE 400, may utilize one or more components, such as the processor 402, the memory 404, the PDCCH monitoring and processing module 408, the transceiver 410, and the one or more antennas 416, to execute the steps of method 1400. The method 1400 may employ similar mechanisms as in the method 800, 900, and/or 1100 described with respect to FIGS. 8, 9, and/or 11, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes obtaining a plurality of search spaces (e.g., the search spaces 322 and 1022) for a DL control channel. The plurality of search spaces includes a first resource overlapping with a preconfigured resource (e.g., the resource 610 and 810). In some instances, each search space of the plurality of search spaces can be referred to as a PDCCH candidate search space within a search space set. Each PDCCH candidate search space may be referred to as a PDCCH candidate or a PDCCH candidate search space. The search space set can be referred to as an instance of a CORESET.

At step 1420, the method 1400 includes monitoring for a DL control message (e.g., the PDCCH candidates 620 and the DCI 1030) form the DL control channel in the plurality of search spaces.

In an embodiment, the wireless communication device may receive a signal from a first search space (e.g., the search spaces 322c and 322d) of the plurality of search spaces including the first resource. The wireless communication device may decode the DL control message from the signal based on a location of the preconfigured resource, for example, using rate matching as shown in the method 700 or puncturing as shown in the method 800.

In an embodiment, the wireless communication device can receive a configuration indicating the preconfigured resource allocated for a transmission of at least one of a synchronization signal, a reference signal, or a downlink data channel signal (e.g., a PDSCH signal).

Figure 15:
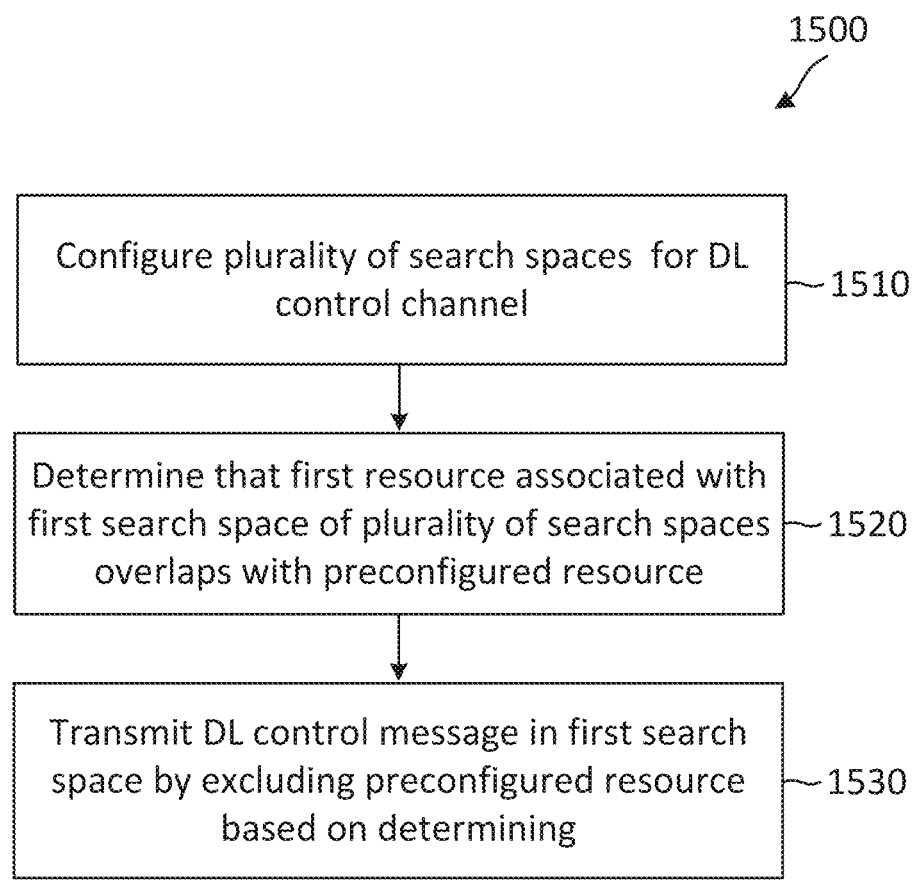
FIG. 15 is a flow diagram of a DL control channel transmission method according to embodiments of the present disclosure.

FIG. 15 is a flow diagram of a DL control channel transmission method 1500 according to embodiments of the present disclosure. Steps of the method 1500 can be executed by a computing device (e.g., a processor, processing circuit, and/or other suitable component) of a wireless communication device or other suitable means for performing the steps. For example, a wireless communication device, such as the BS 105 or BS 500, may utilize one or more components, such as the processor 502, the memory 504, the PDCCH configuration and communication module 508, the transceiver 510, and the one or more antennas 516, to execute the steps of method 1500. The method 1500 may employ similar mechanisms as in the method 800, 900, and/or 1100 described with respect to FIGS. 8, 9, and/or 11, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes configuring plurality of search spaces (e.g., the search spaces 322 and 1022) for a DL control channel. In some instances, each search space of the plurality of search spaces can be referred to as a PDCCH candidate search space within a search space set. Each PDCCH candidate search space may be referred to as a PDCCH candidate or a PDCCH candidate search space. The search space set can be referred to as an instance of a CORESET.

At step 1520, the method 1500 includes determining that a first resource associated with a first search space of the plurality of search spaces overlaps with a preconfigured resource (e.g., the resources 610 and 810).

At step 1530. The method 1500 includes transmitting a DL control message in the first search space by excluding the preconfigured resource based on the determining.

In an embodiment, the wireless communication device may encode the DL control message based on a location of the preconfigured resource, for example, using rate matching as shown in the method 700 or puncturing as shown in the method 800. The wireless communication device may transmit a signal including the encoded DL control message using resources in the first search space that are outside the preconfigured resource.

In an embodiment, the wireless communication device may transmit a configuration indicating the preconfigured resource allocated for a transmission of at least one of a synchronization signal, a reference signal, or a downlink data channel signal (e.g., a PDSCH signal).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the disclosure include a method of wireless communication, comprising identifying, by a wireless communication device, a plurality of search spaces for a downlink control channel; determining, by the wireless communication device, that a first resource associated with a first search space of the plurality of search spaces overlaps with a preconfigured resource; and monitoring, by the wireless communication device, for a downlink control message over the downlink control channel by excluding monitoring in at least the first search space based on the determining.

In some embodiments, the method further comprises determining, by the wireless communication device, that resources of a second search space of the plurality of search spaces does not overlap with any preconfigured resources, wherein the monitoring includes monitoring, by the wireless communication device, the downlink control message from the second search space. In some embodiments, wherein the determining includes determining, by the wireless communication device, whether the plurality of search spaces is associated with a set of control resources including the first resource overlapping with the preconfigured resource, and wherein the monitoring excludes monitoring in any of the plurality of search spaces when determining that the plurality of search spaces is associated with the set of control resources. In some embodiments, the method further comprises receiving, by the wireless communication device, a configuration indicating the preconfigured resource allocated for a transmission of at least one of a synchronization signal, a reference signal, or a downlink data channel signal.

Further embodiments of the disclosure include a method of wireless communication, comprising configuring, by a wireless communication device, a plurality of search spaces for a downlink control channel; determining, by the wireless communication device, that a first resource associated with a first search space of the plurality of search spaces overlaps with a preconfigured resource; and transmitting, by the wireless communication device, a downlink control message using resources outside of at least the first search space based on the determining.

In some embodiments, wherein the transmitting includes transmitting, by the wireless communication device, the downlink control message in a second search space of the plurality of search spaces that is non-overlapping with any preconfigured resources. In some embodiments, wherein the determining includes determining, by the wireless communication device, whether the plurality of search spaces is associated with a set of control resources including the first resource overlapping with the preconfigured resource, and wherein the method further comprises refraining, by the wireless communication device, from transmitting a downlink control message in any of the plurality of search spaces when determining that the plurality of search spaces is associated with the set of control resources. In some embodiments, the method further comprises transmitting, by the wireless communication device, a configuration indicating the preconfigured resource allocated for a transmission of at least one of a synchronization signal, a reference signal, or a downlink data channel signal.

Further embodiments of the disclosure include a method of wireless communication, comprising obtaining, by a wireless communication device, a plurality of search spaces for a downlink control channel, the plurality of search spaces including a first resource overlapping with a preconfigured resource; and monitoring, by the wireless communication device, for a downlink control message from the downlink control channel in the plurality of search spaces.

In some embodiments, the method further comprises receiving, by the wireless communication device, a signal from a first search space of the plurality of search spaces including the first resource; and decoding, by the wireless communication device, the downlink control message from the signal based on a location of the preconfigured resource. In some embodiments, wherein the decoding includes performing rate matching based on the location of the preconfigured resource. In some embodiments, wherein the decoding includes puncturing one or more bits based on the location of the preconfigured resource. In some embodiments, the method further comprises receiving, by the wireless communication device, a configuration indicating the preconfigured resource allocated for a transmission of at least one of a synchronization signal, a broadcast communication signal, a reference signal, or a downlink data channel signal.

Further embodiments of the disclosure include a method of wireless communication, comprising configuring, by a wireless communication device, a plurality of search spaces for a downlink control channel; determining, by the wireless communication device, that a first resource associated with a first search space of the plurality of search spaces overlaps with a preconfigured resource; and transmitting, by the wireless communication device, a downlink control message in the first search space by excluding the preconfigured resource based on the determining.

In some embodiments, the method further comprises encoding, by the wireless communication device, the downlink control message based on a location of the preconfigured resource, wherein the transmitting includes transmitting a signal including the encoded downlink control message in the first search space. In some embodiments, wherein the encoding includes performing rate matching based on the location of the preconfigured resource. In some embodiments, wherein the encoding includes puncturing one or more bits based on a location of the preconfigured resource. In some embodiments, the method further comprises transmitting, by the wireless communication device, a configuration indicating the preconfigured resource allocated for a transmission of at least one of a synchronization signal, a broadcast communication signal, a reference signal, or a downlink data channel signal.

Further embodiments of the disclosure include an apparatus comprising a processor (e.g., the processor 402 and/or the PDCCH monitoring and processing module 408) configured to identify a plurality of search spaces for a downlink control channel; determine that a first resource associated with a first search space of the plurality of search spaces overlaps with a preconfigured resource; and monitor for a downlink control message over the downlink control channel by excluding monitoring in at least the first search space based on the determination.

In some embodiments, wherein the processor is further configured to determine that resources of a second search space of the plurality of search spaces does not overlap with any preconfigured resources; and monitor for the downlink control message from the second search space. In some embodiments, wherein the processor is further configured to determine whether the plurality of search spaces is associated with a set of control resources including the first resource overlapping with the preconfigured resource; and exclude monitoring in any of the plurality of search spaces when the plurality of search spaces is determined to be associated with the set of control resources. In some embodiments, the apparatus further comprises a transceiver (e.g., the transceiver 410) configured to receive a configuration indicating the preconfigured resource allocated for a transmission of at least one of a synchronization signal, a broadcast communication signal, a reference signal, or a downlink data channel signal.

Further embodiments of the disclosure include an apparatus comprising a processor (e.g., the processor 502 and/or the PDCCH configuration and communication module 508) configured to configure a plurality of search spaces for a downlink control channel; and determine that a first resource associated with a first search space of the plurality of search spaces overlaps with a preconfigured resource; and a transceiver (e.g., the transceiver 510) configured to transmit a downlink control message using resources outside of at least the first search space based on the determination.

In some embodiments, wherein the transceiver is further configured to transmit the downlink control message in a second search space of the plurality of search spaces that is non-overlapping with any preconfigured resources. In some embodiments, wherein the processor is further configured to determine whether the plurality of search spaces is associated with a set of control resources including the first resource overlapping with the preconfigured resource, and wherein the processor is further configured to refrain from transmitting a downlink control message in any of the plurality of search spaces when the plurality of search spaces is determined to be associated with the set of control resources. In some embodiments, wherein the transceiver is further configured to transmit a configuration indicating the preconfigured resource allocated for a transmission of at least one of a synchronization signal, a broadcast communication signal, a reference signal, or a downlink data channel signal.

Further embodiments of the disclosure include an apparatus comprising a processor (e.g., the processor 402 and/or the PDCCH monitoring and processing module 408) configured to obtain a plurality of search spaces for a downlink control channel, the plurality of search spaces including a first resource overlapping with a preconfigured resource; and monitor for a downlink control message from the downlink control channel in the plurality of search spaces.

In some embodiments, the apparatus further comprises a transceiver (e.g., the transceiver 410) configured to receive, a signal from a first search space of the plurality of search spaces including the first resource, wherein the processor is further configured to decode the downlink control message from the signal based on a location of the preconfigured resource. In some embodiments, wherein the processor is further configured to decode the downlink control message by performing rate matching based on the location of the preconfigured resource. In some embodiments, wherein the processor is further configured to decode the downlink control message by puncturing one or more bits based on the location of the preconfigured resource. In some embodiments, the apparatus further comprises a transceiver configured to receive a configuration indicating the preconfigured resource allocated for a transmission of at least one of a synchronization signal, a broadcast communication signal, a reference signal, or a downlink data channel signal.

Further embodiments of the disclosure include an apparatus comprising a processor (e.g., the processor 502 and/or the PDCCH configuration and communication module 508) configured to configure a plurality of search spaces for a downlink control channel; and determine that a first resource associated with a first search space of the plurality of search spaces overlaps with a preconfigured resource; and a transceiver (e.g., the transceiver 510) configured to transmit a downlink control message in the first search space by excluding the preconfigured resource based on the determination.

In some embodiments, wherein the processor is further configured to encode the downlink control message based on a location of the preconfigured resource, wherein the transceiver is further configured to transmit the downlink control message by transmitting a signal including the encoded downlink control message in the first search space. In some embodiments, wherein the processor is further configured to encode the downlink control message by performing rate matching based on the location of the preconfigured resource. In some embodiments, wherein the processor is further configured to encode the downlink control message by puncturing one or more bits based on a location of the preconfigured resource. In some embodiments, wherein the transceiver is further configured to transmit a configuration indicating the preconfigured resource allocated for a transmission of at least one of a synchronization signal, a broadcast communication signal, a reference signal, or a downlink data channel signal.

Further embodiments of the disclosure include a computer-readable medium, for example memory 404 with reference to FIG. 4 or other computer-readable medium, having program code recorded thereon, the program code comprising code for causing a wireless communication device to identify a plurality of search spaces for a downlink control channel; code for causing the wireless communication device to determine that a first resource associated with a first search space of the plurality of search spaces overlaps with a preconfigured resource; and code for causing the wireless communication device to monitor for a downlink control message over the downlink control channel by excluding monitoring in at least the first search space based on the determination.

In some embodiments, the computer-readable medium further comprises code for causing the wireless communication device to determine that resources of a second search space of the plurality of search spaces does not overlap with any preconfigured resources, wherein the code for monitoring the downlink control message is further configured to monitor the downlink control message from the second search space. In some embodiments, wherein the code for causing the wireless communication device to determine that the first resource overlaps with the preconfigured resource is further configured to determine whether the plurality of search spaces is associated with a set of control resources including the first resource overlapping with the preconfigured resource, and wherein the code for monitoring the downlink control message is further configured to exclude monitoring in any of the plurality of search spaces when the plurality of search spaces is determined to be associated with the set of control resources. In some embodiments, the computer-readable medium further comprises code for causing the wireless communication device to receive a configuration indicating the preconfigured resource allocated for a transmission of at least one of a synchronization signal, a broadcast communication signal, a reference signal, or a downlink data channel signal.

Further embodiments of the disclosure include a computer-readable medium, for example memory 504 with reference to FIG. 5 or other computer-readable medium, having program code recorded thereon, the program code comprising code for causing a wireless communication device to configure a plurality of search spaces for a downlink control channel; code for causing the wireless communication device to determine that a first resource associated with a first search space of the plurality of search spaces overlaps with a preconfigured resource; and code for causing the wireless communication device to transmit a downlink control message using resources outside of at least the first search space based on the determination.

In some embodiments, wherein the code for causing the wireless communication device to transmit the downlink control message is further configured to transmit the downlink control message in a second search space of the plurality of search spaces that is non-overlapping with any preconfigured resources. In some embodiments, wherein the code for causing the wireless communication device to determine that the first resource overlaps with the preconfigured resource is further configured to determine whether the plurality of search spaces is associated with a set of control resources including the first resource overlapping with the preconfigured resource, and wherein the computer-readable medium further comprises code for causing the wireless communication device to refrain from transmitting a downlink control message in any of the plurality of search spaces when the plurality of search spaces is determined to be associated with the set of control resources. In some embodiments, the computer-readable medium further comprises code for causing the wireless communication device to transmit a configuration indicating the preconfigured resource allocated for a transmission of at least one of a synchronization signal, a broadcast communication signal, a reference signal, or a downlink data channel signal.

Further embodiments of the disclosure include a computer-readable medium, for example memory 404 with reference to FIG. 4 or other computer-readable medium, having program code recorded thereon, the program code comprising code for causing a wireless communication device to obtain a plurality of search spaces for a downlink control channel, the plurality of search spaces including a first resource overlapping with a preconfigured resource; and code for causing the wireless communication device to monitor for a downlink control message from the downlink control channel in the plurality of search spaces.

In some embodiments, the computer-readable medium further comprises code for causing the wireless communication device to receive a signal from a first search space of the plurality of search spaces including the first resource; and code for causing the wireless communication device to decode the downlink control message from the signal based on a location of the preconfigured resource. In some embodiments, wherein the code for causing the wireless communication device to decode the downlink control message from the signal is further configured to perform rate matching based on the location of the preconfigured resource. In some embodiments, wherein the code for causing the wireless communication device to decode the downlink control message from the signal is further configured to puncture one or more bits based on the location of the preconfigured resource. In some embodiments, the computer-readable medium further comprises code for causing the wireless communication device to receive a configuration indicating the preconfigured resource allocated for a transmission of at least one of a synchronization signal, a broadcast communication signal, a reference signal, or a downlink data channel signal.

Further embodiments of the disclosure include a computer-readable medium, for example memory 504 with reference to FIG. 5 or other computer-readable medium, having program code recorded thereon, the program code comprising code for causing a wireless communication device to configure a plurality of search spaces for a downlink control channel; code for causing the wireless communication device to determine that a first resource associated with a first search space of the plurality of search spaces overlaps with a preconfigured resource; and code for causing the wireless communication device to transmit a downlink control message in the first search space by excluding the preconfigured resource based on the determination.

In some embodiments, the computer-readable medium further comprises code for causing the wireless communication device to encode the downlink control message based on a location of the preconfigured resource, wherein the code for causing the wireless communication device to transmit the downlink control message is further configured to transmit a signal including the encoded downlink control message in the first search space. In some embodiments, wherein the code for causing the wireless communication device to encode the downlink control message is further configured to perform rate matching based on the location of the preconfigured resource. In some embodiments, wherein the code for causing the wireless communication device to encode the downlink control message is further configured to puncture one or more bits based on a location of the preconfigured resource. In some embodiments, the computer-readable medium further comprises code for causing the wireless communication device to transmit a configuration indicating the preconfigured resource allocated for a transmission of at least one of a synchronization signal, a broadcast communication signal, a reference signal, or a downlink data channel signal.

Further embodiments of the disclosure include an apparatus comprising means for identifying a plurality of search spaces for a downlink control channel; means for determining that a first resource associated with a first search space of the plurality of search spaces overlaps with a preconfigured resource; and means for monitoring for a downlink control message over the downlink control channel by excluding monitoring in at least the first search space based on the determination.

In some embodiments, the apparatus further comprises means for determining that resources of a second search space of the plurality of search spaces does not overlap with any preconfigured resources, wherein the means for monitoring for the downlink control message is further configured to monitor the downlink control message from the second search space. In some embodiments, wherein the means for determining that the first resource overlaps with the preconfigured resource is further configured to determine whether the plurality of search spaces is associated with a set of control resources including the first resource overlapping with the preconfigured resource, wherein the means for monitoring for the downlink control message is further configured to exclude monitoring in any of the plurality of search spaces when the plurality of search spaces is determined to be associated with the set of control resources. In some embodiments, the apparatus further comprises means for receiving a configuration indicating the preconfigured resource allocated for a transmission of at least one of a synchronization signal, a broadcast communication signal, a reference signal, or a downlink data channel signal.

Further embodiments of the disclosure include an apparatus comprising means for configuring a plurality of search spaces for a downlink control channel; means for determining that a first resource associated with a first search space of the plurality of search spaces overlaps with a preconfigured resource; and means for transmitting a downlink control message using resources outside of at least the first search space based on the determination.

In some embodiments, wherein the means for transmitting the downlink control message is further configured to transmit the downlink control message in a second search space of the plurality of search spaces that is non-overlapping with any preconfigured resources. In some embodiments, wherein the means for determining that the first resource overlaps with the preconfigured resource is further configured to determine whether the plurality of search spaces is associated with a set of control resources including the first resource overlapping with the preconfigured resource, and wherein the apparatus further comprises means for refraining from transmitting a downlink control message in any of the plurality of search spaces within the slot based when the plurality of search spaces is determined to be associated with the set of control resources. In some embodiments, the apparatus further comprises means for transmitting a configuration indicating the preconfigured resource allocated for a transmission of at least one of a synchronization signal, a broadcast communication signal, a reference signal, or a downlink data channel signal.

Further embodiments of the disclosure include an apparatus comprising means for obtaining a plurality of search spaces for a downlink control channel, the plurality of search spaces including a first resource overlapping with a preconfigured resource; and means for monitoring for a downlink control message from the downlink control channel in the plurality of search spaces.

In some embodiments, the apparatus further comprises means for receiving a signal from a first search space of the plurality of search spaces including the first resource; and means for decoding the downlink control message from the signal based on a location of the preconfigured resource. In some embodiments, wherein the means for decoding the downlink control message from the signal is further configured to perform rate matching based on the location of the preconfigured resource. In some embodiments, wherein the means for decoding the downlink control message from the signal is further configured to puncture one or more bits based on the location of the preconfigured resource. In some embodiments, the apparatus of claim further comprises means for receiving a configuration indicating the preconfigured resource allocated for a transmission of at least one of a synchronization signal, a broadcast communication signal, a reference signal, or a downlink data channel signal.

Further embodiments of the disclosure include an apparatus comprising means for configuring a plurality of search spaces for a downlink control channel; means for determining that a first resource associated with a first search space of the plurality of search spaces overlaps with a preconfigured resource; and means for transmitting a downlink control message in the first search space by excluding the preconfigured resource based on the determination.

In some embodiments, the apparatus further comprises means for encoding the downlink control message based on a location of the preconfigured resource, wherein the means for transmitting the downlink control message is further configured to transmit a signal including the encoded downlink control message in the first search space. In some embodiments, wherein the means for encoding the downlink control message is further configured to perform rate matching based on the location of the preconfigured resource. In some embodiments, wherein the means for encoding the downlink control message is further configured to puncture one or more bits based on a location of the preconfigured resource. In some embodiments, the apparatus further comprises means for transmitting a configuration indicating the preconfigured resource allocated for a transmission of at least one of a synchronization signal, a broadcast communication signal, a reference signal, or a downlink data channel signal.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    identifying, by a wireless communication device, a search space set including a plurality of physical downlink control channel (PDCCH) candidate search spaces for a downlink control channel;
    receiving, by the wireless communication device, a first configuration indicating a first preconfigured resource allocated for a transmission of a synchronization signal block (SSB) wherein the first configuration is received via a radio resource control (RRC) message;
    receiving, by the wireless communication device, a second configuration indicating a second preconfigured resource allocated for a transmission of at least one of a broadcast communication signal, a reference signal, or a downlink data channel signal;
    determining, by the wireless communication device, that a first resource associated with a first PDCCH candidate search space of the plurality of PDCCH candidate search spaces overlaps with the first preconfigured resource indicated by the RRC message and allocated for a transmission of the SSB;
    determining, by the wireless communication device, that a second resource associated with a second PDCCH candidate search space of the plurality of PDCCH candidate search spaces overlaps with the second preconfigured resource; and
    monitoring, by the wireless communication device, for a downlink control message over the downlink control channel by:
        excluding monitoring of at least the entire first PDCCH candidate search space based on the first configuration, and
        excluding monitoring of the second PDCCH candidate search space based on the second configuration.

2. The method of claim 1, further comprising:
    determining, by the wireless communication device, that resources of a third PDCCH candidate search space of the plurality of PDCCH candidate search spaces does not overlap with any preconfigured resources,
    wherein the monitoring includes monitoring, by the wireless communication device, the downlink control message from the third PDCCH candidate search space.

3. The method of claim 1,
    wherein the determining includes:
        determining, by the wireless communication device, whether the search space set is associated with a set of control resources including the first resource overlapping with the first preconfigured resource, and
wherein the monitoring excludes:
monitoring in any of the plurality of PDCCH candidate search spaces in the search space set when determining that the search space set is associated with the set of control resources.

4. An apparatus comprising:
means for identifying a search space set including a plurality of physical downlink control channel (PDCCH) candidate search spaces for a downlink control channel;
means for receiving a first configuration indicating a first preconfigured resource allocated for a transmission of a synchronization signal block (SSB) wherein the first configuration is received via a radio resource control (RRC) message;
means for receiving a second configuration indicating a second preconfigured resource allocated for a transmission of at least one of a broadcast communication signal, a reference signal, or a downlink data channel signal;
means for determining that a first resource associated with a first PDCCH candidate search space of the plurality of PDCCH candidate search spaces overlaps with the first preconfigured resource indicated by the RRC message and allocated for a transmission of the SSB;
means for determining, by the wireless communication device, that a second resource associated with a second PDCCH candidate search space of the plurality of PDCCH candidate search spaces overlaps with the second preconfigured resource; and
means for monitoring for a downlink control message over the downlink control channel by:
excluding monitoring of at least the entire first PDCCH candidate search space based on the first congiguration, and
excluding monitoring of the second PDCCH candidate search space based on the second configuration.

5. The apparatus of claim 4, further comprising:
means for determining that resources of a third PDCCH candidate search space of the plurality of PDCCH candidate search spaces does not overlap with any preconfigured resources,
wherein the means for monitoring for the downlink control message is further configured to monitor the downlink control message from the third PDCCH candidate search space.

6. The apparatus of claim 4, wherein the means for determining that the first resource overlaps with the first preconfigured resource is further configured to:
determine whether the search space set is associated with a set of control resources including the first resource overlapping with the first preconfigured resource,
wherein the means for monitoring for the downlink control message is further configured to exclude:
monitoring in any of the plurality of PDCCH candidate search spaces in the search space set when the search space set is determined to be associated with the set of control resources.

7. An apparatus comprising:
one or more memories;
one or more processors, coupled to the one or more memories, and configured to:
identify a search space set including a plurality of physical downlink control channel (PDCCH) search spaces for a downlink control channel;
receive a first configuration indicating a first preconfigured resource allocated for a transmission of a synchronization signal block (SSB) wherein the first configuration is received via a radio resource control (RRC) message;
receive a second configuration indicating a second preconfigured resource allocated for a transmission of at least one of a broadcast communication signal, a reference signal, or a downlink data channel signal;
determine that a first resource associated with a first PDCCH candidate search space of the plurality of PDCCH candidate search spaces overlaps with the first preconfigured resource indicated by the RRC message and allocated for a transmission of the SSB;
determine, by the wireless communication device, that a second resource associated with a second PDCCH candidate search space of the plurality of PDCCH candidate search spaces overlaps with the second preconfigured resource; and
monitor for a downlink control message over the downlink control channel by:
excluding monitoring of at least the entire first PDCCH candidate search space based on the first configuration, and
excluding monitoring of the second PDCCH candidate search space based on the second configuration.

8. The apparatus of claim 7, wherein the one mor more processors are further configured to:
determine that resources of a third PDCCH candidate search space of the plurality of PDCCH candidate search spaces does not overlap with any preconfigured resources,
wherein the monitoring for the downlink control message is further configured to monitor the downlink control message from the third PDCCH candidate search space.

9. The apparatus of claim 7, wherein the determination that the first resource overlaps with the first preconfigured resource is further configured to:
determine whether the search space set is associated with a set of control resources including the first resource overlapping with the first preconfigured resource,
wherein the monitoring for the downlink control message excludes monitoring in any of the plurality of PDCCH candidate search spaces in the search space set when the search space set is determined to be associated with the set of control resources.

10. The apparatus of claim 7, wherein the one or more processors are further configured to:
receive a configuration indicating another preconfigured resource allocated for a transmission of at least one of a synchronization signal, a broadcast communication signal, a reference signal, or a downlink data channel signal.

* * * * *